US012010387B1

(12) United States Patent
Moderhack et al.

(10) Patent No.: US 12,010,387 B1
(45) Date of Patent: Jun. 11, 2024

(54) CONTENT-BASED VOICE TARGETING OF DEVICES USING SLOT AND TASK DATA

(71) Applicant: Amazon Technologies, Inc., Seattle, WA (US)

(72) Inventors: Genna Michelle Krecicki Moderhack, Somerville, MA (US); Tom Vessella, Seattle, WA (US); Clare Elizabeth Veladanda, Sunnyvale, CA (US); Monty Eich, San Jose, CA (US); Ratika Anand, San Jose, CA (US)

(73) Assignee: Amazon Technologies, Inc., Seattle, WA (US)

(*) Notice: Subject to any disclaimer, the term of this patent is extended or adjusted under 35 U.S.C. 154(b) by 103 days.

(21) Appl. No.: 17/488,671

(22) Filed: Sep. 29, 2021

(51) Int. Cl.
| | |
|---|---|
| *H04N 21/472* | (2011.01) |
| *G06F 3/16* | (2006.01) |
| *G06F 16/2457* | (2019.01) |
| *G06F 40/295* | (2020.01) |
| *G10L 15/26* | (2006.01) |
| *H04L 12/28* | (2006.01) |
| *H04M 1/05* | (2006.01) |
| *H04N 21/422* | (2011.01) |
| *H04N 21/439* | (2011.01) |
| *H04R 27/00* | (2006.01) |

(52) U.S. Cl.
CPC ....... *H04N 21/47217* (2013.01); *G06F 3/167* (2013.01); *G06F 40/295* (2020.01); *H04N 21/42203* (2013.01); *H04N 21/439* (2013.01); *G06F 16/24578* (2019.01); *G10L 15/26* (2013.01); *H04L 12/2803* (2013.01); *H04M 1/05* (2013.01); *H04R 27/00* (2013.01)

(58) Field of Classification Search
CPC .. G06F 3/167; G06F 40/295; G06F 16/24578; H04L 12/2803; H04M 1/05; H04N 21/47217; G10L 15/26; H04R 27/00
USPC ......................................... 340/584; 707/737
See application file for complete search history.

(56) References Cited

U.S. PATENT DOCUMENTS

| | | | |
|---|---|---|---|
| 2008/0158000 A1* | 7/2008 | Mattrazzo | ............... H04M 1/05 340/584 |
| 2014/0181107 A1* | 6/2014 | Coburn, IV | ...... G06F 16/24578 707/737 |

(Continued)

FOREIGN PATENT DOCUMENTS

WO WO 2016/145235 * 9/2016

*Primary Examiner* — Farzad Kazeminezhad
(74) *Attorney, Agent, or Firm* — K&L Gates LLP

(57) ABSTRACT

Devices and techniques are generally described for voice targeting of devices using content type. In various examples, a first natural language input comprising a first request to perform a first action related to first content may be received. A natural language understanding component may be used to determine first intent data representing a semantic interpretation of the first request, where the first intent data is effective to cause a first skill to perform the first action. A named entity recognition component may be used to determine first slot data included in the first request. The first slot data may identify the first content. First task data associated with the first content may be determined. The first task data may associate the first content with playback on a first device. First instructions effective to cause the first device to perform the first action may be sent to the first device.

20 Claims, 11 Drawing Sheets

(56) References Cited

U.S. PATENT DOCUMENTS

2017/0243587 A1* 8/2017 Plagge ................ H04L 12/2803
2020/0258512 A1* 8/2020 Smith .................... G06F 3/167

* cited by examiner

| Device ID(s) | Device/Group name | Content metadata |
|---|---|---|
| Smart_speaker_3 | kitchen | Artist: Band$1  Song: Jelloz%  ... |
| Smart_speaker_1 Smart_device_2 | [ad hoc] | Title: Lakes  Studio: Paramax  ... |
| Smart_device_4 | N/A | Service: StreamGo@t  ... |
| ... | ... | ... |

FIG. 9

CONTENT-BASED VOICE TARGETING OF DEVICES USING SLOT AND TASK DATA

BACKGROUND

Automatic speech recognition (ASR) combined with language processing techniques may enable a computing device to retrieve and process commands from a user based on the user's spoken commands. In some systems, speech recognition and/or voice-controlled devices activate upon detection of a spoken "wakeword." Natural language processing is used to translate the spoken requests into semantic interpretations of the spoken command. A speech processing application (e.g., a "skill") is selected for processing the spoken request. Executable instructions are generated based on the semantic interpretation of the spoken command. The executable instructions are executed by the skill and a corresponding task is performed. Such speech processing and voice control may be used by personal computers, hand-held devices, telephone computer systems, and a wide variety of other computing devices to improve human-computer interactions and to control various systems.

BRIEF DESCRIPTION OF DRAWINGS

FIG. 9 is a block diagram of a non-transitory computer-readable memory storing task data, in accordance with various aspects of the present disclosure.

DETAILED DESCRIPTION

Figure 1A:
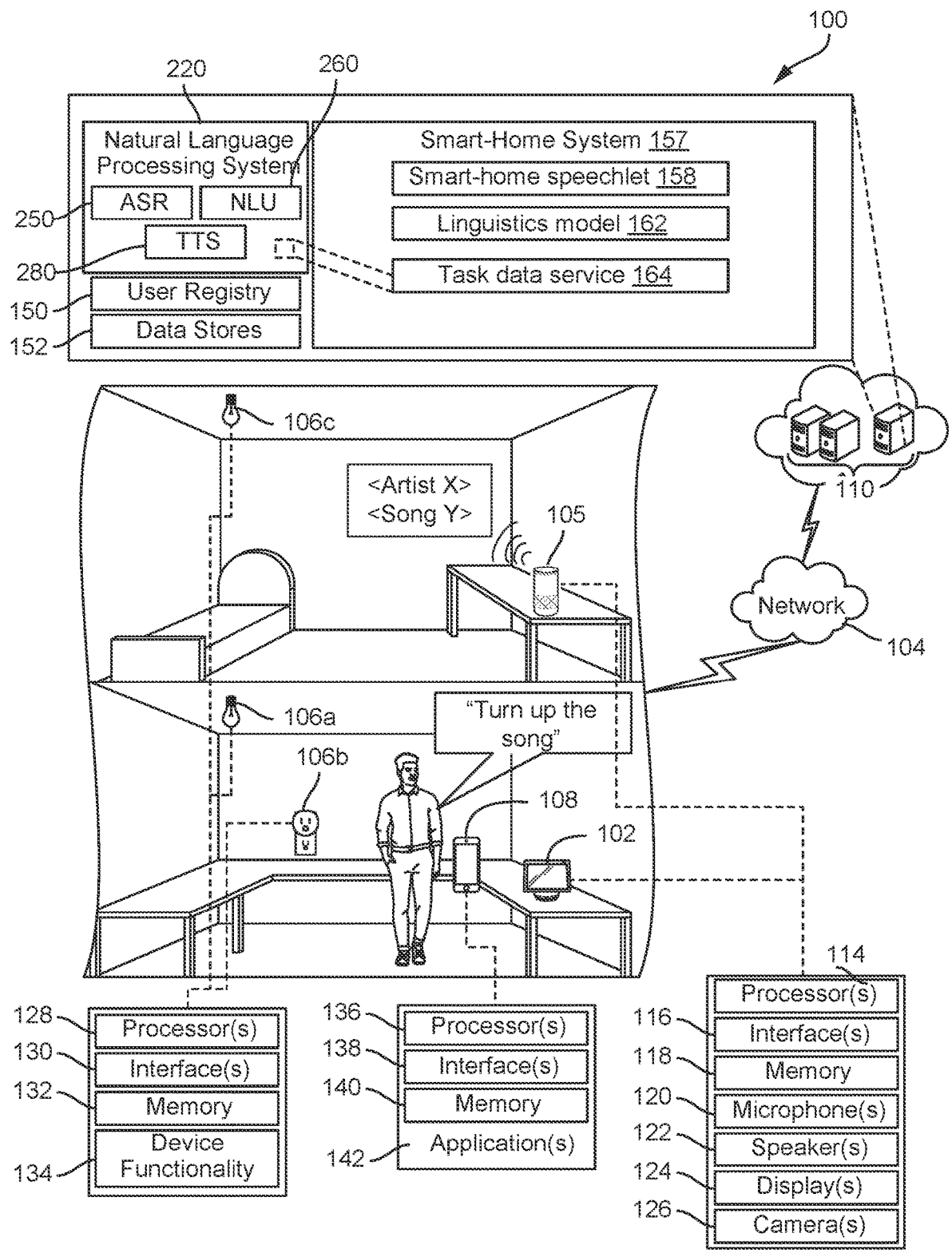
FIG. 1A is a block diagram illustrating an example environment for content-based voice targeting of devices, according to various aspects of the present disclosure.

In the following description, reference is made to the accompanying drawings that illustrate several examples of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Internet-of-Things (IoT) and other devices are configured with network communication capability and/or other computing functions allowing these devices to send data to and/or receive data from other devices. Examples of such devices include networked appliances, smart phones, light bulbs ("smart bulbs"), electrical outlets ("smart outlets"), door locks (e.g., "smart locks"), voice-enabled personal assistant devices, smart speakers, etc. As such devices become more and more prevalent in both the home, office, public spaces, quasi-public spaces (e.g., hotels, retail spaces), and elsewhere generally, and as the technology matures, new services and features are being developed. One example of such services may include grouping together different IoT devices to synchronize playback of content by the grouped devices. In some examples, the groups may be created and deleted dynamically by the user, either before content playback has been initiated or during playback. For example, a user may initiate playback of music on a first smart speaker and may later request that a second smart speaker (or other device comprising a speaker and the relevant audio drivers) be grouped together with the first smart speaker such that the music is synchronously played back by both the first smart speaker and the second smart speaker (or other device). Additional devices may be added to the group and/or devices may be removed from the group, as desired.

In some examples described herein, users may use natural language commands that relate in some way to content that is being output by one or more network-connected devices. For example, a user may refer to a song title, movie name, video or music streaming service, and/or another aspect related to content that is currently being played back in a user request. However, absent the various techniques described herein, it may be ambiguous to determine on which device to take user-requested actions when the user refers to the content, but not to a specific device. Accordingly, described herein are techniques that may be used to determine on which device to take a user-requested action based on the user's references to content that is currently in a playback state. For example, when a user begins playback of content on a device, task data may be generated that associates the content (and various metadata describing the content) with the device(s) on which the playback has been initiated. Thereafter, when a user issues a new natural language command that refers in some way to the content, but which does not explicitly refer to a target device, named entity recognition (NER) processes may be used to determine an entity (e.g., slot data such as {artist name}, {song name}, {title}, {content type}, {streaming service}, etc.) that is named by the user in the user's request. The slot data representing the entity may be used to query current task data to determine the appropriate content to output and/or the appropriate devices on which to output the content.

For example, music by {artist name} may be playing on a kitchen speaker and task data may be stored in memory that associates the content (and its metadata) with an identifier for the kitchen speaker. The user may later be in the user's living room and may issue the voice command "Alexa, play the song in here" to a smart speaker in the user's living room. The slot data {song} may be identified using NER. As described in further detail below, NER may evaluate different lexicons and/or grammar structures for different intents and/or skills to determine that "song" represents a type of content referred to by the user. The slot data {song} may be used to query the task data. The task data associates metadata of the current song from {artist name} with the device ID of the kitchen speaker. The metadata may include various information describing the content (described in further detail below) including that the content is of the type {song}. Accordingly, the slot data extracted using NER ({song}) may be used to determine that the user is referring to the song by {artist name} (e.g., the song that is currently in a playback state on the kitchen speaker). Accordingly, synchronized playback of the same song may be initiated on the living room speaker in response to the user's request.

Although in the above example the user has issued a spoken request to play content, in some examples, detected presence of a user may optionally be used to initiate synchronized playback of content when a user enters a new space. For example, when a user enters a new room or pre-defined zone that includes a device with a speaker or display, the user's presence may be detected (e.g., using a passive infrared sensor, computer vision, etc.) and task data may be queried to determine content that is in a playback state. In some other examples, presence detection may be determined using facial detection and/or recognition, speaker detection/recognition (e.g., using speaker identification processing), wireless signal/device identifier association, sound processing (e.g., footsteps, voice detection), device connection signals (e.g., where a device associated with a known user connects to a local access point), etc. The content may be output (in a synchronized manner) in the space in which the user's presence has been detected. In some cases, playback of content may "follow" the user throughout a space (e.g., based on detected presence information identifying a presence of the user and/or explicit user commands). In some examples, music playback may be terminated when a user leaves a zone or space and may be initiated when a user arrives in a zone or space. In this context, a zone or space may be an area where a device effective to output the relevant content is located. For example, different rooms may be defined as separate zones and each room may have a smart speaker located within. As the user moves from room to room, the playback of content may be initiated in rooms that the user is entering and stopped in rooms that the user is leaving. Task data may be updated accordingly to describe the content metadata as well as the current device identifiers of devices that are currently playing back the content.

In various examples, playback may be synchronized by reference to a clock (e.g., a global clock and/or a clock of a source device of a streaming service and/or a gateway device receiving a multi-cast stream). Frames of the stream may be timestamped with respect to the clock to indicate a time at which to play the content. In addition, the source device may send the clock information of the source device's clock separately so that offsets may be determined between the source clock and the timestamps included at the frame level of the content. Devices outputting the stream may determine the offset in order to play each frame of the content at the same time as other devices intended to synchronously output the content.

In some examples, users may explicitly define a group of devices that may be targeted for synchronous content playback. For example, a user may use a companion application of a virtual assistant to define a group of devices for synchronous playback. For example, a user may group a smart speaker located in the user's kitchen with an IoT device that includes a display and one or more speakers that is located in the user's living room. In the example, the user may name the group of devices "downstairs" (or any other desired name). Thereafter, the user may control playback of content on the group of devices by using a command to initiate synchronous playback of content on the group. For example, the user may use a natural language processing system of a virtual assistant to initiate and/or control playback on the group by saying something like "Computer, play [Artist Name] downstairs." Since the group has been explicitly defined by the user with the name "downstairs," a target determination service may match the user-specified target (e.g., "downstairs") with the explicitly-defined group name "downstairs" stored in a user registry and/or other data store associated with the user account.

However, in some examples, a user may group together devices for synchronous playback in an ad-hoc manner without explicitly defining and/or providing a name for the group. For example, a user may have initiated playback of content on a first device and may thereafter request that a second device also play the content. Similarly, a user may be playing synchronized content on an explicitly-defined group, but may then stop playback on a subset of the devices in the explicitly-defined group such that the devices that continue to engage in synchronized playback constitute an undefined, ad-hoc group of devices. Accordingly, as used herein, "ad hoc" groups refer to groups of devices engaged in synchronized playback of content for which there is no explicit user-defined group name. If, after creating such an ad hoc group, the user later desires to control playback for the group (e.g., turn the volume up, pause music playback, skip track, play a new playlist, etc.) using voice commands, it may be ambiguous to determine that the user is referring to controlling playback on the ad hoc group, since the group is un-named.

For example, if the user has created an ad hoc group that includes a smart speaker named "kitchen," and the user addresses the ad hoc group by saying "Computer, turn the volume up," it may be ambiguous whether the user wants the volume increased only on the device receiving the spoken command, or on each device in the ad hoc group. Similarly, if the user says "Computer, pause the music in the kitchen," does the user want playback to be paused on each device in the ad hoc group, or does the user only want playback to be paused on the device named "kitchen" ?

Described herein are various systems and techniques that may be used to perform content-based voice targeting of devices including devices grouped together in such ad hoc groups. For example, natural language processing techniques and process flows may be used to determine the type of content referred to in a user request. The various techniques may further determine which devices are currently engaged in playback of the user-specified content. Device control instructions may then be sent to those devices that are engaged in playback of the user-specified content. As described in further detail below, the device control instructions may correspond to the intent of the user's natural language request (e.g., a volume control intent, a pause playback intent, etc.).

Automatic speech recognition (ASR) is a field of computer science, artificial intelligence, and linguistics concerned with transforming audio data associated with speech into text data and/or other ASR output data representative of that speech. Natural language understanding (NLU) is a field of computer science, artificial intelligence, and linguistics concerned with enabling computers to derive meaning from text input containing natural language, resulting in specific executable commands or other type of instructions. As described in further detail below, in some examples, NLU processing may include multiple different processes that may be executed for a given natural language input in order to determine a semantic interpretation of the natural language input. Text-to-speech (TTS) is a field of computer science, artificial intelligence, and linguistics concerned with enabling computers to output synthesized speech. ASR, NLU, and TTS may be used together as part of a natural language processing system. As used in, natural language input data may comprise audio data (e.g., representing a user request or command), text data, and/or other representation data representing natural language for input into a natural language processing system.

As used herein, user utterances, input text data, and/or any form of data input to a natural language processing system ("input data") may be described by "request data" and/or "user request data." Such request data may change forms many times during processing of the request data by various components of the speech processing system. For example, initially the request data may be audio data and/or input text data representing a user question. The audio data may be transformed into text data and/or other ASR output data by an ASR component of the speech processing system. The text data and/or other ASR output data may be transformed into intent data by an NLU component of the speech processing system. The intent data may be used by a speech processing application (e.g., a skill) to perform an action (e.g., to generate action data (e.g., computer-executable instructions) that may be processed in order to take some corresponding action such as answering a user's question, playing video, playing audio, etc.). "Request data" and/or "user request data" may refer to any data related to an input request to a speech processing system (e.g., including the various data forms described above, as each of the aforementioned data types relate to an input request to the speech processing system). In general, as used herein, natural language processing "applications" may be any software (and/or combination of software and hardware) used during natural language processing to take an action in response to input request data (e.g., natural language inputs such as user utterances and/or text). Such applications may include speech processing skills, speechlets, and/or other types of speech processing software.

In various examples, natural language processing systems may determine an action to take for processing particular request data according to an interpretation of the natural language input (represented by the request data), as determined by NLU. Dialog sessions may be carried out between a user and a natural language processing system. A dialog session may include multiple turns of dialog between the user and TTS synthesized speech output by the natural language processing system. In a simple example, a user request (e.g., "Computer, turn on the kitchen light") followed by a natural language response (e.g., "OK, turning on the kitchen light at 80% brightness") constitutes a dialog session with two turns. Dialog sessions may include any number of turns. For example, in the previous example of controlling the kitchen light, the user may respond by saying "No, set the kitchen light to 100% brightness." The dialog session may continue with the natural language processing system outputting the synthesized speech "OK, setting kitchen light to 100% brightness." In this example, the dialog session may have four turns (e.g., two user turns and two voice assistant turns).

The various techniques described herein may be used in a variety of contexts, including in natural language processing enabled devices (e.g., devices employing voice control and/or speech processing "voice assistants") and/or systems.

Examples of speech processing systems and/or voice-enabled personal assistants include the Siri system from Apple Inc. of Cupertino, California, voice-enabled actions invoked by the Google Assistant system from Google LLC of Mountain View, California, Dragon speech recognition software from Nuance Communications of Burlington, Massachusetts, the Cortana system from Microsoft of Redmond, Washington, the Alexa system from Amazon.com, Inc. of Seattle, Washington, etc. Other examples of smart home devices and/or systems that may use the various content-based voice targeting techniques described herein may include Google Nest Smarthome products from Google LLC, HomeKit devices from Apple Inc., etc. In addition, the various content-based voice targeting techniques described herein may be implemented on a natural language processing enabled device and/or on another device that is communicating on a network with one or more other network-connected devices. For example, the various content-based voice targeting techniques described herein may be executed on a smart home "hub" device configured to control various other network-connected devices on premises. In some other examples, the various content-based voice targeting techniques described herein may be executed on a mobile device (e.g., on a user's phone, laptop, etc.) or a desktop device.

Natural language processing enabled devices may include one or more microphones (e.g., far-field microphone arrays) used to transform audio into electrical signals. Speech processing may then be performed, either locally by the speech processing enabled device, by one or more other computing devices communicating with the speech processing enabled device over a network, or by some combination of the natural language processing enabled device and the one or more other computing devices. In various examples, natural language processing enabled devices may include and/or may be configured in communication with speakers and/or displays effective to output information obtained in response to a user's spoken request or command, and/or to output content that may be of interest to one or more users.

Storage and/or use of data related to a particular person or device (e.g., device names, names of device groups, contextual data, and/or any personal data) may be controlled by a user using privacy controls associated with a speech processing enabled device and/or a companion application associated with a speech processing enabled device. Users may opt out of storage of personal, device state (e.g., a paused playback state, etc.), and/or contextual data and/or may select particular types of personal, device state, and/or contextual data that may be stored while preventing aggregation and storage of other types of personal, device state, and/or contextual data. Additionally, aggregation, storage, and use of personal, device state, and/or contextual information, as described herein, may be compliant with privacy controls, even if not legally subject to them. For example, personal, contextual, device state, and other data described herein may be treated as if it was subject to acts and regulations, such as the Health Insurance Portability and Accountability Act (HIPAA) and the General Data Protection Regulation (GDPR), even if it is not actually subject to these acts and regulations. In various examples, the device and/or device group names and/or any data captured by such devices may be used only in accordance with user permission, in compliance with any relevant laws and/or policies. Additionally, users may opt out of data collection, and/or may opt to delete some or all of the data used by the various techniques described herein, even where deletion or noncollection of various data may result in reduced functionality and/or performance of various aspects of the systems described herein.

Natural language processing systems may be configured with multiple applications (e.g., thousands, tens of thousands, or more applications) that can be used to potentially respond to a user request. Applications may be referred to herein as "skills". Natural language processing systems may be effective to process spoken and/or textual natural language inputs to determine data representing a semantic understanding of the inputs. Skills may include any application effective to receive inputs from a natural language processing system in order to take one or more actions based on those inputs. For example, a speech processing system may include music skills, video skills, calendar skills, timer skills, general knowledge answering skills, game skills, device control skills, etc. As described herein, skills receive NLU data comprising slot data and/or intent data and are configured to determine one or more actions based on the slot data and/or intent data. Examples of such actions may include text to be processed into output audio data (e.g., synthetic speech) via a text-to-speech (TTS) component, an executable command effective to play a song from a music service, a movie from a movie service, or the like, an executable command effective to cause a system to perform an action (e.g., turning lights on/off, controlling an appliance, purchasing an item, etc.). In various examples, skills may execute one or more of the task models described herein for performance of skill-specific actions.

In various examples, a natural language processing enabled device may include a wakeword detection component. The wakeword detection component may process audio data captured by microphones of the speech processing enabled device and may determine whether or not a keyword (e.g., a wakeword) is detected in the audio data. When a wakeword is detected, the speech processing enabled device may enter a "sending mode" in which audio detected by the microphones following the wakeword (e.g., data representing user request data spoken after the wakeword) may be sent to natural language processing computing component(s) (either locally or remotely) for further natural language processing (e.g., ASR, NLU, etc.). In various examples, the wakeword detection component may be used to distinguish between audio that is intended for the natural language processing system and audio that is not intended for the natural language processing system.

FIG. 1A illustrates a diagram of an example environment and system 100 for content-based voice targeting of devices, in accordance with various examples. The system 100 may include, for example, a first voice-enabled device 102 and a second voice-enabled device 105. The first voice-enabled device 105 and/or the second voice-enabled device 105 may be configured to receive user utterances and perform operations in response to such user utterances. In these examples, the first voice-enabled device 102 and/or the second voice-enabled device 105 may be "hands free" such that interactions with the devices are performed through audible requests and responses. The first voice-enabled device 102 may be located or otherwise situated in a first space. The second voice-enabled device 105 may be located or otherwise situated in a second space. As shown by way of example in FIG. 1A, the first voice-enabled device 102 is located in an "office" while the second voice-enabled device 105 is located in a "bedroom." It should be understood that the devices may be located in spaces other than those specifically mentioned in this disclosure. It should also be understood that while the spaces depicted in FIG. 1A are rooms, the spaces may be any space.

The system 100 may also include one or more accessory devices 106a-106c. The accessory devices 106a-c may be described as "smart" devices, which may have certain computing components and be configured to send and/or receive data from other devices. The accessory devices 106a-c may be, for example, light bulbs, plugs, locks, televisions, appliances, doorbells, cameras, etc. As shown in FIG. 1A, the first space in which the first voice-enabled device 102 is situated may include a first accessory device 106a, which may be a light bulb, and a second accessory device 106b, which may be a plug. The accessory devices 106a-c may be "paired" or otherwise associated with the first voice-enabled device 102 and/or the second voice-enabled device 105. As such, the accessory devices 106a-c may be configured to send data to and/or receive data from the voice-enabled devices 102, 105. Likewise, the second space in which the second voice-enabled device 105 is situated may include a third accessory device 106c, which may be a light bulb. The third accessory device 106c may be paired or otherwise associated with the voice-enabled devices 102, 105. The accessory devices 106a-c may be associated with naming indicators, which may be provided by a user of the accessory devices 106a-c, the remote system 110, and/or one or more third-party systems.

The system 100 may also include a personal device 108, which may include a mobile device such as a mobile phone. The personal device 108 may be associated with the voice-enabled devices 102, 105 and/or the accessory device 106a-c. In these examples, the personal device 108 may be configured to send data to and/or receive data from the voice-enabled devices 102, 105 and/or the accessory devices 106a-c.

The first voice-enabled device 102, the second voice-enabled device 105, the accessory devices 106a-c, and/or the personal device 108 may be configured to send data to and/or receive data from a remote system 110, such as via a network 104. In examples, one or more of the component of the system 110 may communicate directly with the remote system 110, via the network 104. In other examples, one or more of the accessory devices 106a-c may communicate with one or more of the voice-enabled devices 102, 105, and the voice-enabled devices 102, 105 may communicate with the remote system 110. Additionally, the personal device 108 may communicate directly with the voice-enabled devices 102, 105, the accessory devices 106a-c, and/or the remote system 110. In further examples, a hub device, not shown in FIG. 1A, may be utilized by the accessory devices 106a-c and/or the voice-enabled devices 102, 105 to send data to and/or receive data from other devices.

The first voice-enabled device 102 and/or the second voice-enabled device 105 may include one or more components, such as, for example, one or more processors 114, one or more network interfaces 116, memory 118, one or more microphones 470, one or more speakers 122, one or more displays 124, and/or one or more cameras 126. The microphones 470 may be configured to capture audio, such as user utterances, and generate corresponding audio data. The speakers 122 may be configured to output audio, such as audio corresponding to audio data received from another device (e.g., from a content streaming service) and/or the remote system 110. The displays 124 may be configured to present images, such as images corresponding to image data received from another device and/or the remote system 110. The cameras 126 may be configured to capture images and to generate corresponding image data.

The accessory devices 106a-c may include one or more components, such as, for example, one or more processors 128, one or more network interfaces 130, memory 132, and/or device functionality components 134. The memory 132 and/or processors 128 may be utilized to cause certain operations to be performed by the accessory devices 106a-c, such as activating and/or deactivating the device functionality components 134. The device functionality components 134 may include components associated with the intended use of the accessory devices 106a-c. For example, the first accessory device 106a may be a light bulb, and in this example, the device functionality components 134 may include a filament and/or light emitting diode that may produce and/or emit light. By way of further example, the second accessory device 106b may be a wall plug, and in this example, the device functionality components 134 may include an "on/off mechanism" for causing electricity to flow or not flow to a device that is plugged in to the wall plug. It should be noted that the device functionality components 134 illustrated here are by way of example only.

The personal device 108 may include one or more components such as, for example, one or more processors 136, one or more network interfaces 138, and memory 140. The memory 140 may include one or more components, such as, for example, one or more applications 142. The applications 142 may reside on the memory 140 of the personal device 108 and/or the applications 142 may reside elsewhere, such as with the remote system 110, and may be accessible via the personal device 108. The applications 142 may be configured to cause the processors 136 to display one or more user interfaces associated with operations of the voice-enabled devices 102, 105 and/or the accessory devices 106a-c. The user interfaces may be utilized to receive inputs from the user of the personal device 108 and/or to provide content to the user.

The remote system 110 may include components such as, for example, a user registry 150, one or more data stores 152, a natural language processing system 220, and/or a smart-home system 157. The natural language processing system 220 may include an automatic speech recognition (ASR) component 250, a natural language understanding (NLU) component 260 (including a named entity recognition component), and/or a text-to-speech (TTS) component 280. The smart-home system 157 may include a smart-home speechlet 158, one or more linguistics models 162, and/or a task data service 164, among other potential components. In some examples, the smart-home system 157 may include one or more components of the natural language processing system 220. For example, as described herein, the natural language processing system 220 may include an orchestrator service effective to implement the task data service 164. In some examples, the smart-home system 157 may implement the task data service 164. However, in other examples, the task data service 164 may be implemented remotely (e.g., by remote system 110). In various other examples, the natural language processing system 220 may be implemented in part by smart-home system 157 and in part by one or more remote computing devices, such as remote system 110. Each of the components described herein with respect to the remote system 110 may be associated with their own systems, which collectively may be referred to herein as the remote system 110, and/or some or all of the components may be associated with a single system. In examples, some or each of the components of the remote system 110 may include their own processor(s), network interface(s), and/or memory. As such, by way of example, the natural language processing system 220 may include and/or be associated with processor(s), network interface(s), and/or memory. The smart-home system 157 may include and/or be associated with different processor(s), network interface(s), and/or memory, or one or more of these components may utilize some or all of the same processor(s), network interface(s), and/or memory utilized by the natural language processing system 220. These components are described in detail below. Additionally, the operations and/or functionalities associated with and/or described with respect to the components of the remote system 110 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

The user registry component 150 may be configured to identify, determine, and/or generate associations between users, user accounts, and/or devices. For example, one or more associations between user profiles and user accounts may be identified, determined, and/or generated by the user registry 150. The user registry 150 may additionally store information indicating one or more applications and/or resources accessible to and/or enabled for a given user account. Additionally, the user registry 150 may include information indicating device identifiers, such as naming identifiers, associated with a given user account, as well as device types associated with the device identifiers. The user registry 150 may also include information indicating user account identifiers, naming indicators of devices associated with user accounts, and/or associations between voice-enabled devices 102, 105 and accessory devices 106a-c. It should also be understood that the terms "user account" may be used to describe a set of data and/or functionalities associated with a given account identifier. For example, data identified, determined, and/or generated while using some or all of the system 110 may be stored or otherwise associated with an account identifier. Data associated with the user accounts may include, for example, account access information, historical usage data, device-association data, and/or preference data. In some examples, smart home system 157 may provide names and/or device Ids of explicitly-named devices (and/or groups of devices) to task data service 164. For example, smart home system 157 may control particular network-connected devices communicating via a local area network. The smart home system 157 may store identifier data identifying such devices and/or which may be used to target such devices for network communication. The identifier data (and/or device names) may be accessible by task data service 164. In various examples, task data service 164 may store a name and/or identifier data for a device in task data. The task data may associate the name and/or identifier data of the device with content metadata describing content currently being played back by the device.

The data stores 152 may be configured to identify, determine, and/or generate data associated with use of the voice-enabled devices 102, 105 and/or the accessory devices 106a-c. For example, the voice-enabled devices 102, 105 may be utilized to cause the accessory devices 106a-c to operate. Usage data may be identified, determined, and/or generated that indicates some or each of these interactions. In various examples, data representing ad hoc groupings of the various devices of FIG. 1A may be stored in data stores 152. Device-state data, prior-request data, and/or other usage data may also be identified, determined, and/or generated. It should be understood that while the user registry 150 and the data stores 152 are illustrated as separate components, the user registry 150 and the data stores 152 may be the same component.

The remaining components of the remote system 110 that are illustrated in FIG. 1A will be described below by way of an example use case. It should be noted that this use case is provided for illustrative purposes, and not by way of limitation. In various examples, a user may explicitly define groups of devices on which playback of content (e.g., music, video, audio, etc.) may be synchronized. For example, the user may define a group called "office" that groups together voice-enabled devices 102 and 105. This is merely an example of two devices that may be grouped. Any network-enabled devices communicating on a local area network may be grouped together. In the example, the explicitly-named group "office" and data identifying its constituent devices (e.g., device identifier data) may be stored in user registry 150 and/or in data stores 152. Thereafter, a user may control playback of content for the group by referring directly to the group name "office" in the user's requests.

However, in some examples, a user may group together devices dynamically without assigning the group an explicit name that is stored in the user registry 150, data store 152, and/or elsewhere. For example, the user may initiate playback on a first device. For example, a user may use the spoken request, "Alexa, play {Artist_name} in kitchen." In this example, a device may be explicitly named "kitchen" in user registry 150. Accordingly, natural language processing system 220 may process the user's spoken request to begin playback of the requested content on the device named "kitchen." Later, the user may walk into the user's living room. The user may want to synchronize the playback of the music on a device explicitly named "living room." Accordingly, the user may say "Alexa, play {Artist_name} in living room." The smart-home system 157 may synchronize playback of the content between the "kitchen" device and the "living room" device in an ad hoc group of the devices. Accordingly, the user has created a group that synchronizes playback between the "kitchen" device and the "living room" device. However, this group may not have been labeled with an explicit group name that is stored in memory (e.g., in user registry 150 or data store 152). As previously described, such dynamically created groups are referred to herein as "ad hoc" groups. These groups may be ephemeral, such that when the content is terminated (e.g., by the user or by playback being completed) the group is dissipated and playback is no longer synchronized between the constituent devices of the ad hoc group.

Described herein are various techniques for targeting such ad hoc groups of devices when explicit name-based targeting is unavailable. In the example depicted in FIG. 1A, the user may have previously created an ad hoc group comprising playback of a song (e.g., "Song Y") by an artist (e.g., "Artist X") on voice-enabled devices 102 and 105. As previously described, the ad hoc group may not be associated with any explicit name that may be used to target the group for execution of commands. The user may want to turn up the volume on the song. Accordingly, as shown in FIG. 1A, the user may speak the command "Turn up the song." Natural language processing 220 may use automatic speech recognition component 250 to transcribe the spoken request into text (or other ASR output data representing the audio of the request). NLU component 260 may determine a semantic interpretation of the request. For example, NLU component 260 may determine that the request corresponds to a "Volume_up" intent that may be processed by a skill to turn the volume up by 15% (or some other percentage and/or amount) on a device that is currently in a playback state. Additionally, a named entity recognition component (not shown in FIG. 1A) may be used to determine the slot data "song."

An orchestrator component of the natural language processing system 220 may retrieve task data from the task data service 164. The task data may associate various data related to the content that is being played with device identifier data identifying those devices on which the content is being played. For example, the task data may associate "Song Y", "Artist X", a name of a streaming service streaming the song, a type of the content (e.g., music, song, etc.), a genre of the content (e.g., opera, rock, hip-hop, etc.), and/or other information pertaining to the content with the voice-enabled devices 102, 105 that are currently playing back the song. The orchestrator component may use the slot data "song" to determine which devices are currently playing back content of the type "song." In the example, the task data associates the content type "song" with voice-enabled devices 102 and 105. Accordingly, the orchestrator may send the "Volume_up" intent to the voice-enabled devices 102 and 105 as computer-executable instructions effective to cause the voice-enabled devices 102 and 105 to turn the volume up.

In the foregoing example, the user refers to the type of content (e.g., the user refers to a "song" in the spoken request). However, in other examples, the user may instead refer to a name of an artist of the content, a title of the content (e.g., a song title, video title, etc.), a streaming service (e.g., Amazon Music, etc.), a genre of the content, and/or some other reference to the content being played. When playback is initiated, task data may be generated using the task data service to associate the various metadata associated with the content (e.g., artist name, song title, streaming service, etc.) with the device on which the playback has been initiated. For example, the initial device on which playback is initiated may be explicitly named using a predefined device name (e.g., a device name stored in user registry 150 and/or data stores 152). Thereafter, as the user adds additional devices (e.g., creating an ad hoc group of devices) the task data may be updated to reflect all devices included in the ad hoc group (e.g., all devices synchronizing playback of the content).

In a different example, instead of an ad hoc group, the song: "Song Y" by "Artist X" may initially be in playback on voice-enabled device 105. Accordingly, task data generated by task data service 164 may associate the metadata artist name: {Artist X}, song name: {Song Y}, content type: {song}, etc., with identifier data that identifies the voice-enabled device 105. Thereafter, when the user issues the spoken command "Turn up the song" to the voice-enabled device 102 (e.g., in a different room of the user's home), NER may be used to determine the slot data {song} that corresponds to an entity identifying the content type. The previously-generated task data may be queried and used to determine that {song} is associated with {Artist X} and {Song Y} being played back on a device ID that corresponds to voice-enabled device 105. Accordingly, the volume of playback of Song Y by Artist X may be increased on voice-enabled device 105.

The speechlet(s) (such as smart-home speechlet 158) described herein may include a speech-enabled web component that may run in the remote system 110. Speechlet(s) may receive and respond to speech-initiated requests. Speechlet(s) may define life-cycle events for a skill as experienced by a user, a way to process speech requests from the user, and/or call-backs from events happening on the device the user is interacting with. Given speechlet(s) may be capable of handling certain intents. For example, the NLU component may generate intent data that indicates an intent as well as a payload associated with the intent. A speechlet may be associated with the intent, and thus the intent data, including the payload may be sent to and received by the speechlet. The speechlet may process that intent by analyzing the payload and generating data representing a directive and/or instruction to perform an action. The directive and/or instruction may be sent to other components of the system for performance of the action.

As used herein, a processor, such as processor(s) 114, 128, and/or 136, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 114, 128, 136, and/or the processor(s) described with respect to the components of the remote system 110 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 114, 128, 136, and/or the processor(s) described with respect to the components of the remote system 110 may possess its own local memory, which also may store program components, program data, and/or one or more operating systems.

The memory 118, 132, 140, and/or the memory described with respect to the components of the remote system 110 may include volatile and nonvolatile memory, removable and non-removable media implemented in any method or technology for storage of information, such as computer-readable instructions, data structures, program component, or other data. Such memory 118, 132, 140, and/or the memory described with respect to the components of the remote system 110 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 118, 132, 140, and/or the memory described with respect to the components of the remote system 110 may be implemented as computer-readable storage media ("CRSM"), which may be any available physical media accessible by the processor(s) 114, 128, 136, and/or the processor(s) described with respect to the components of the remote system 110 to execute instructions stored on the memory 118, 132, 140, and/or the memory described with respect to the components of the remote system 110. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

The network interface(s) 116, 130, 138, and/or the network interface(s) described with respect to the components of the remote system 110 may enable messages between the components and/or devices shown in system 110 and/or with one or more other remote systems, as well as other networked devices. Such network interface(s) 116, 130, 138, and/or the network interface(s) described with respect to the components of the remote system 110 may include one or more network interface controllers (NICs) or other types of transceiver devices to send and receive messages over the network 104.

For instance, each of the network interface(s) 116, 130, 138, and/or the network interface(s) described with respect to the components of the remote system 110 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 116, 130, 138, and/or the network interface(s) described with respect to the components of the remote system 110 may include a wide area network (WAN) component to enable message over a wide area network.

In some instances, the remote system 110 may be local to a space associated the first voice-enabled device 102 and/or the second voice-enabled device 105. For instance, the remote system 110 may be located within the first voice-enabled device 102 and/or the second voice-enabled device 105. In some instances, some or all of the functionality of the remote system 110 may be performed by the first voice-enabled device 102 and/or the second voice-enabled device 105. Also, while various components of the remote system 110 have been labeled and named in this disclosure and each component has been described as being configured to cause the processor(s) to perform certain operations, it should be understood that the described operations may be performed by some or all of the components and/or other components not specifically illustrated.

Figure 1B:
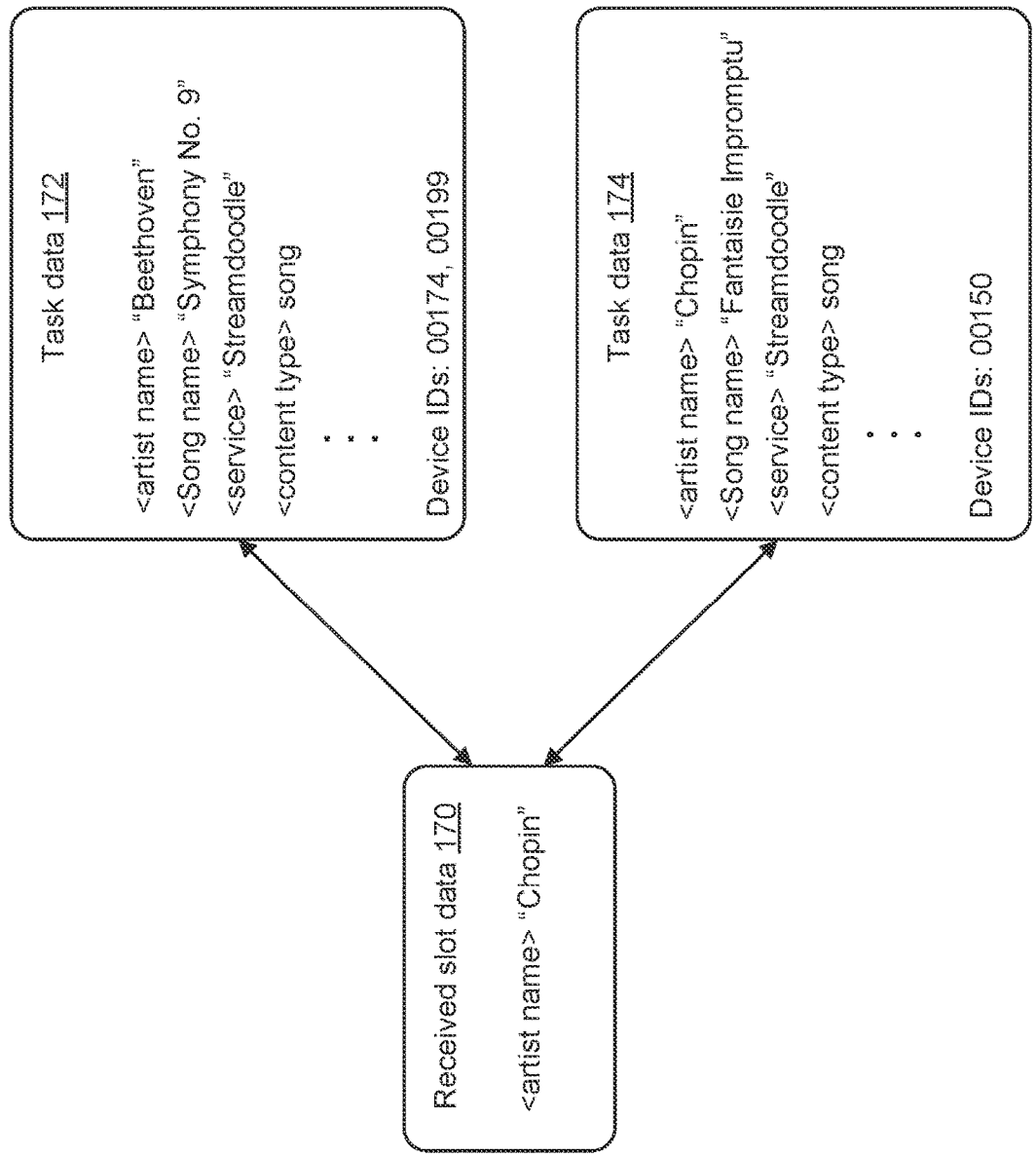
FIG. 1B is a block diagram illustrating an example of matching an entity received in a request with task data, in accordance with various aspects of the present disclosure.

FIG. 1B is a block diagram illustrating an example of matching an entity received in a request with task data, in accordance with various aspects of the present disclosure. In the example of FIG. 1B, a user may have issued a natural language request, such as "Alexa, mute the Chopin." As described in further detail below, NER processing may be used to determine the entity "Chopin" based on a music control skill and a mute intent of the music control skill. The entity Chopin may be identified as an entity of the type {artist name}.

In the example of FIG. 1B, task data 172 associates content metadata with two devices which are currently outputting content. More specifically, in the example, two devices with device IDs 00174 and 00199 (e.g., smart speakers and/or other devices effective to output music) may be playing the song "Symphony No. 9" by the artist "Beethoven" using the streaming service "Streamdoodle." Additionally, other metadata describing the content being played back may also be included. In the example of FIG. 1B, the {content type} field may identify that the type of content being output is a song. As described in further detail below, any type of metadata describing any aspect of the content may be included depending on the desired implementation. Some non-limiting examples may include genres, characters (e.g., of a movie), scene descriptions, instrumentation (e.g., of a song), a studio, record labels, etc.

In the example, task data 174 associates content metadata with a different device (relative to task data 172) which is currently outputting different content. More specifically, in the example, the devices with device ID 00150 may be playing the song "Fantaisie Impromptu" by the artist "Chopin" using the streaming service "Streamdoodle." The user has requested that Chopin be muted. Accordingly, the entity "Chopin" that is included in the user's request may be compared to task data 172 and task data 174 to determine that the user's request relates to the content being played back on device ID 00150. Accordingly, instructions may be sent to the device corresponding to device ID 00150 effective to mute the content.

Figure 2:
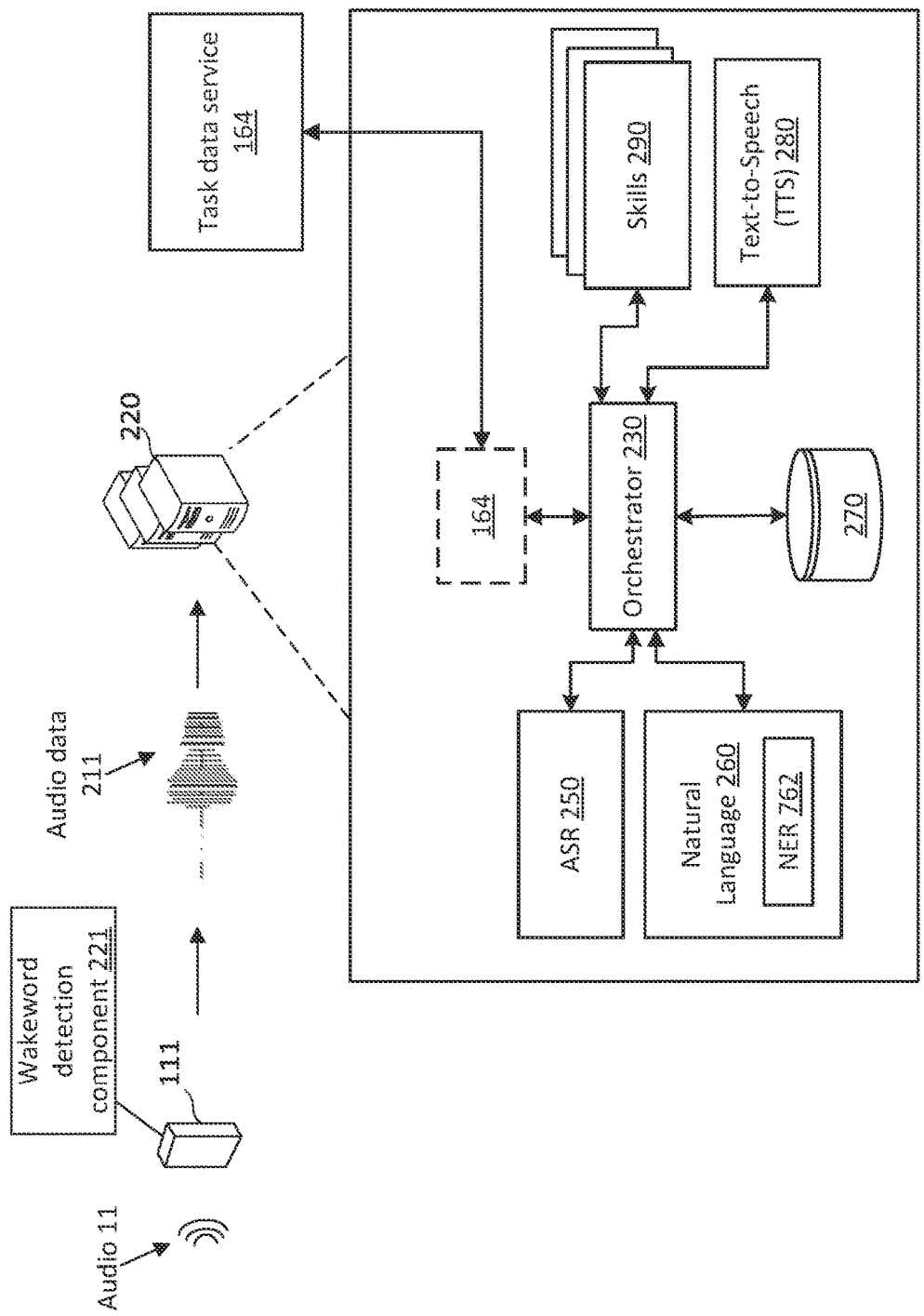
FIG. 2 is a block diagram of various components of a natural language processing system that may be used in accordance with various aspects of the present disclosure.

FIG. 2 is a block diagram of various components of a natural language processing system 220 that may be used in accordance with various aspects of the present disclosure. Although not necessarily limited to such, the system may operate using various natural language processing components as described in FIG. 2. The various components may be located on same or different physical devices. Communication between various components may occur directly or across a network(s). For example, ASR output data (e.g., text data representing a current utterance) output by ASR component 250 may be used to determine an intent of the utterance by natural language component 260. Thereafter, orchestrator 230 may route the intent to one or more skill components 290 effective to process the intent (as well as slot data included in the utterance) to perform an action. In some cases, the action may include output of synthesized speech using the TTS component 280.

An audio capture component(s), such as a microphone or array of microphones of the device 111 (e.g., a network-connected device 120 that is enabled with natural language processing capability), captures audio 11. The device 111 processes audio data, representing the audio 11, to determine whether speech is detected. The device 111 may use various techniques to determine whether audio data includes speech. Some embodiments may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 111 may implement a limited classifier configured to distinguish speech from background noise. The classifier may be implemented by techniques such as linear classifiers, support vector machines, and decision trees. In still other examples, Hidden Markov Model (HMM) or Gaussian Mixture Model (GMM) techniques may be applied to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 111 may use a wakeword detection component 221 to perform wakeword detection to determine when a user intends to speak an input to the device 111. This process may also be referred to as keyword detection, with a wakeword being a specific example of a keyword. An example wakeword is "Alexa," "Computer," etc.

Wakeword detection is typically performed without performing linguistic analysis, textual analysis, or semantic analysis. Instead, the audio data representing the audio 11 may be analyzed to determine if specific characteristics of the audio data match preconfigured acoustic waveforms, audio signatures, or other data to determine if the audio data "matches" stored audio data corresponding to a wakeword. The stored audio data may be provided by the natural language processing system 220 and/or may be provided by the user.

The wakeword detection component 221 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword spotting builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 221 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 111 may wake and begin sending audio data 211, representing the audio 11, to the natural language processing system 220. The audio data 211 may include data corresponding to the wakeword, or the portion of the audio data 211 corresponding to the wakeword may be removed by the device 111 prior to sending the audio data 211 to the natural language processing system 220.

Upon receipt by the natural language processing system 220, the audio data 211 may be sent to an orchestrator component 230. The orchestrator component 230 may include memory and logic that enable the orchestrator component 230 to transmit various pieces and forms of data to various components of the system, as well as perform other operations. The orchestrator component 230 sends the audio data 211 to an ASR component 250. The ASR component 250 transcribes the audio data 211 into text data. The text data output by the ASR component 250 represents one or more than one (e.g., in the form of an N-best list) hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 sends the text data generated thereby to an NLU component 260, for example via the orchestrator component 230. The text data sent from the ASR component 250 to the NLU component 260 may include a top scoring ASR hypothesis or may include an N-best list including multiple ASR hypotheses. An N-best list may additionally include a respective score associated with each ASR hypothesis represented therein. Each score may indicate a confidence of ASR processing performed to generate the ASR hypothesis with which the score is associated.

The NLU component 260 attempts to make a semantic interpretation of the phrases or statements represented in the text data input therein. That is, the NLU component 260 determines one or more meanings associated with the phrases or statements represented in the text data based on words represented in the text data. The NLU component 260 determines an intent (e.g., intent data) representing an action that a user desires be performed as well as pieces of the input text data that allow a device (e.g., the device 111, the natural language processing system 220, etc.) to execute the intent. For example, if the text data corresponds to "call John," the NLU component 260 may determine an intent that the system establish a two-way communication channel between the device 111 originating the call and a device of the recipient "John" (a named entity in the utterance). For further example, if the text data corresponds to "turn up volume on Artist X," the NLU component 260 may determine an intent that the system turn up the volume of playback. Named entity recognition 762 (NER component 762) may be used to determine the slot data "Artist X" in the example request. NER component 762 is described in further detail below in reference to FIG. 7.

The NLU component 260 outputs NLU results to the orchestrator component 230.

The NLU results may include an NLU hypothesis, including a representation of an intent and corresponding slot data (e.g., "Artist X" in the prior example) that may be used by a downstream component to perform the intent. Alternatively, the NLU results data may include multiple NLU hypotheses, with each NLU hypothesis representing an intent and corresponding slotted data. Each NLU hypothesis may be associated with a confidence value representing a confidence of the NLU component 260 in the processing performed to generate the NLU hypothesis associated with the confidence value.

As described herein, in various examples, upon determination of an intent and slot data, orchestrator 230 may call the task data service 164. As described in further detail below, task data may be generated by task data service when content playback is initiated by one or more devices (e.g., first voice-enabled device 102 and/or second voice-enabled device 105 of FIG. 1A). The task data may associate metadata describing the content with the device(s) on which the content playback is occurring. In the current example, the user may have initiated playback of a musical artist called "Artist X" on one or more smart speakers. In various examples, the user may have created an ad hoc group by requesting that songs by Artist X be played back synchronously on various devices that are not associated with an explicitly-named predefined group. The task data may associate various metadata describing the content with the devices in the ad hoc group. For example, the metadata may describe a song name that is currently being played back, an album title, the artist name, a name of a music service streaming the content, a genre of the content, etc. The slot data "Artist X" determined by NER component 762 may be used by task data service 164 to perform a lookup operation to determine whether any current task data is associated with Artist X. In the example, the task data service 164 may determine that a group of devices (e.g., the ad hoc group) is currently playing Artist X. Accordingly, this list of devices (e.g., device Ids) may be returned to the orchestrator 230. As described below, the orchestrator 230 may send data identifying the relevant devices (sometimes referred to as "target devices") to the relevant skills along with the intent data and/or slot data determined by NLU component 260 and NER component 762. As described below, the relevant skill (e.g., a skill selected from among skill components 290) may be effective to generate computer-executable instructions corresponding to the intent data and/or the slot data. Accordingly, the relevant skill may send the computer-executable instructions to the relevant target devices provided by orchestrator 230. In some other implementations, the selected skill(s) may send the computer-executable instructions back to orchestrator 230 and the orchestrator 230 may send the computer-executable instructions to the device Ids returned from the task data service 164.

The orchestrator component 230 may send the NLU results to an associated skill component 290. If the NLU results include multiple NLU hypotheses, the orchestrator component 230 may send a portion of the NLU results corresponding to the top scoring NLU hypothesis to a skill component 290 associated with the top scoring NLU hypothesis.

A "skill" or "skill component" may be software running on the natural language processing system 220 that is akin to a software application running on a traditional computing device. That is, a skill component 290 may enable the natural language processing system 220 to execute specific functionality in order to perform one or more actions (e.g., provide information to a user, display content to a user, output music, or perform some other requested action). The natural language processing system 220 may be configured with more than one skill component 290. For example, a weather skill component may enable the natural language processing system 220 to provide weather information, a ride sharing skill component may enable the natural language processing system 220 to schedule a trip with respect to a ride sharing service, a restaurant skill component may enable the natural language processing system 220 to order food with respect to a restaurant's online ordering system, a communications skill component may enable the system to perform messaging or multi-endpoint communications, etc. A skill component 290 may operate in conjunction between the natural language processing system 220 and other devices such as the device 111 or a gateway system in order to complete certain functions. Inputs to a skill component 290 may come from various interactions and input sources. A skill component may include a communications skill 290a which may correspond to a service for performing media processing that may be operated, for example, by a media processing unit (MPU) as discussed below.

The functionality described herein as a skill or skill component may be referred to using many different terms, such as an action, bot, app, application, speechlet or the like. A skill component 290 may include hardware, software, firmware, or the like that may be dedicated to the particular skill component 290 or shared among different skill components 290. A skill component 290 may be part of the natural language processing system 220 (as illustrated in FIG. 2) or may be located at whole (or in part) with one or more separate systems. Unless expressly stated otherwise, reference to a skill, skill device, or skill component may include a skill component operating within the natural language processing system 220 (for example as skill component 290) and/or skill component operating within a system separate from the natural language processing system 220.

A skill component 290 may be configured to perform one or more actions. A skill may enable a skill component 290 to execute specific functionality in order to provide data or produce some other output requested by a user. A particular skill component 290 may be configured to execute more than one skill. For example, a weather skill may involve a weather skill component providing weather information to the natural language processing system 220, a ride sharing skill may involve a ride sharing skill component scheduling a trip with respect to a ride sharing service, an order pizza skill may involve a restaurant skill component ordering pizza with respect to a restaurant's online ordering system, etc.

A skill component 290 may implement different types of skills. Types of skills include home automation skills (e.g., skills that enable a user to control home devices such as lights, door locks, cameras, thermostats, etc.), entertainment device skills (e.g., skills that enable a user to control entertainment devices such as smart TVs, smart speakers, etc.), video skills, flash briefing skills, gaming skills, as well as custom skills that are not associated with any preconfigured type of skill. A skill may also be associated with media operations that may be performed by an MPU. This allows a skill develop to offer media processing features an independent services that may be invoked by a user. For example, a user may say "Alexa, call mom using CatFace" which may result in the system processing the command to initiate a device-to-device video call between the user's device and a device belonging to the user's mother, while routing the video call through an MPU associated with the "CatFace" skill, which may perform media operations such as recognizing a human face and replacing it with a cat face. As can be appreciated, many different media processing skills may be implemented.

The natural language processing system 220 may include a TTS component 280 that generates audio data (e.g., synthesized speech) from text data using one or more different methods. In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The natural language processing system 220 may include profile storage 270 and/or the gateway system may include its own profile storage. The profile storage 270 may include a variety of information related to individual users, groups of users, etc. that interact with the system. The profile storage 270 may include one or more user profiles, with each user profile being associated with a different user identifier. Each user profile may include various user identifying information. Each user profile may also include preferences of the user. Each user profile may also include one or more device identifiers, representing one or more devices of the user.

The profile storage 270 may include one or more group profiles. Each group profile may be associated with a different group identifier. A group profile may be specific to a group of users and/or a group of devices. That is, a group profile may be associated with two or more individual user profiles and/or device profiles. For example, a group profile may be a household profile that is associated with user profiles and/or device profiles associated with multiple users of a single household. A group profile may include preferences shared by all the user profiles and/or device profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. Although depicted in FIG. 2 as a separate component, natural language processing system 220 may be executed wholly or partially by device 111.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and objects in which the component(s) of the system(s) and/or user are located. Permissions may be obtained from a user associated with the device 111, or other devices discussed herein.

Figure 3A:
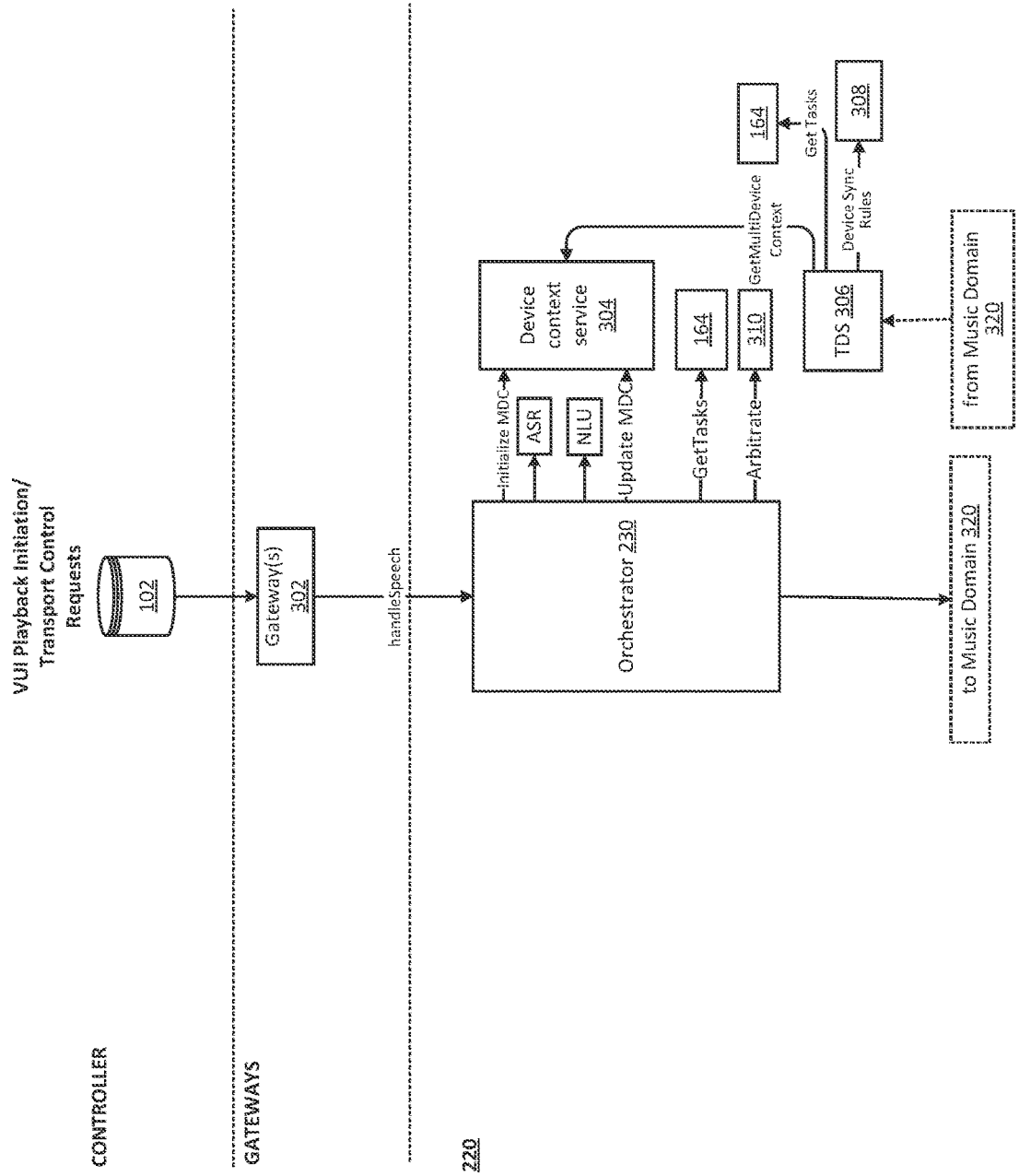
FIGS. 3A and 3B depict a flow diagram illustrating a process flow that may be used for content-based voice targeting of devices, in accordance with various embodiments described herein.
Figure 3B:
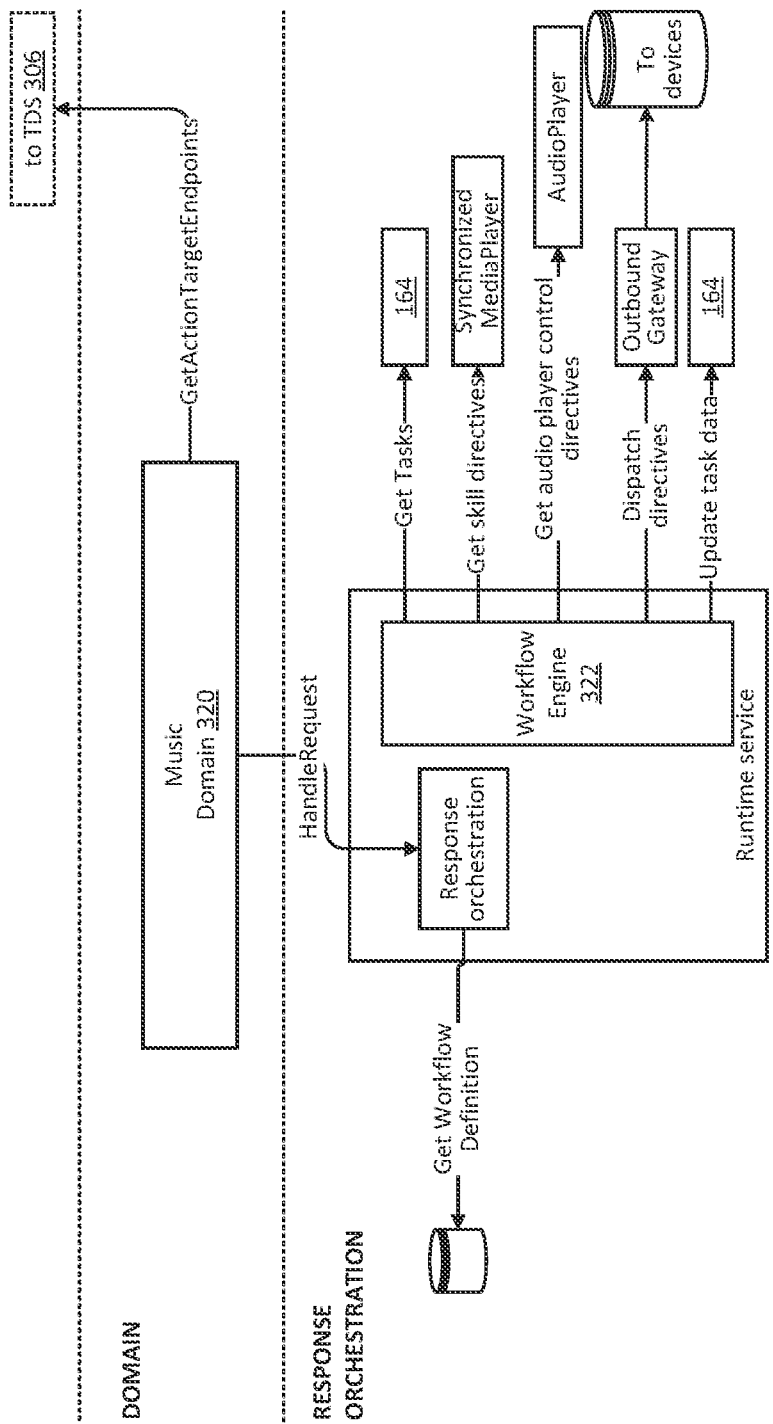

FIGS. 3A and 3B depict a flow diagram illustrating a process flow that may be used for content-based voice targeting of devices, in accordance with various embodiments described herein. In various examples, a voice user interface initiation request may be received from a device, such as first voice-enabled device 102. In the example, the request may be a request to control music playback on an ad hoc group of devices. The audio data representing the spoken request may be sent from the controller device (e.g., the first voice-enabled device 102) to one or more gateway devices 302 used to control access to the natural language processing system 220.

Orchestrator 230 may receive the audio data and may initialize a device context service 304. The device context service 304 may aggregate different signals consumed by target determination service (TDS) 306 to run various heuristics to determine the appropriate endpoint device(s) for performing the user-requested action. The signals may include device states (e.g., device state of the device receiving the spoken request as well as device state of other candidate devices for taking the requested action), proximity signals (e.g., determining the user's proximity to a particular device (e.g., based on detected power levels and/or signal-to-noise ratios of the user request (when detected by multiple devices)), contextual data (e.g., time of day, weather, etc.). TDS 306 may determine device synchronization rules stored in data store 308. The various signals provided by the device context service 304 and the task data returned from task data service 164 may be used by TDS 306 to evaluate the various device synchronization rules to determine which devices should be the target endpoint devices for performing the user-requested action.

Orchestrator 230 may send the audio data to ASR component (e.g., ASR component 250), which may generate text data or other ASR output data representing the user request. The ASR output data may be sent to NLU (e.g., NLU component 260) to perform NER processing (e.g., by NER component 762) and in order to determine intent data representing the semantic intent of the request. Slot data determined using NER component 762 may be used to retrieve task data from task data service 164. For example, the slot data may identify a song name or artist name. The task data stored by task determination service 164 may associate such content metadata with the devices (e.g., devices in an ad hoc group) that are currently playing such content. The device Ids of the relevant devices may be sent to the music domain (FIG. 3B) by TDS 306. In the example in FIGS. 3A, 3B, the device Ids are retrieved by the music domain 320; however, in other examples, TDS 306 may send the device Ids to music domain 320.

A dynamic routing component 310 may use the ASR output data, the intent data, the slot data, context data, and/or the audio data to determine a routing plan for the user request. The routing plan may comprise a ranked list of candidate skills for performing an action in response to the request. The dynamic routing component 310 may employ a variety of statistical machine learning models to select the best candidate skills for processing the user request. In the current example, the dynamic routing component 310 may select the music domain 320 for processing the user request (e.g., the user request to control music playback on the ad-hoc group of devices). In this example, the music domain 320 may be an example of a skill that may take action on the intent data and/or slot data output by NLU. For example, the music domain may generate computer-executable instructions that may be effective to cause the relevant devices (identified by the device Ids output by TDS 306) to perform the user-requested action.

The music domain 320 may retrieve the device Ids determined using TDS 306 and task data service 164 and may send instructions to a response orchestration component to perform the requested action. The response orchestration component may retrieve the specified workflow definition and may execute the workflow in a runtime environment. The workflow may be executed by the workflow engine 322. The workflow may include getting the relevant skill directives from the media player streaming the music, getting the relevant audio control directives (e.g., volume up/down, pause, resume, skip track, etc.) from an audio player executing on the relevant devices (e.g., as determined using the task data service 164), etc.

The directives relevant to the received request may be sent to the device Ids identified using the task data service 164 via an outbound gateway. Thereafter, the task data may be updated by the task data service 164. For example, if the user request was to add another device to the ad hoc group, the task data may be updated to associate the newly-added device with the currently-playing content. In another example, if the user request was to skip the current track, the task data may be updated to delete the previous song title and update it with the new (next) song title.

Figure 4:
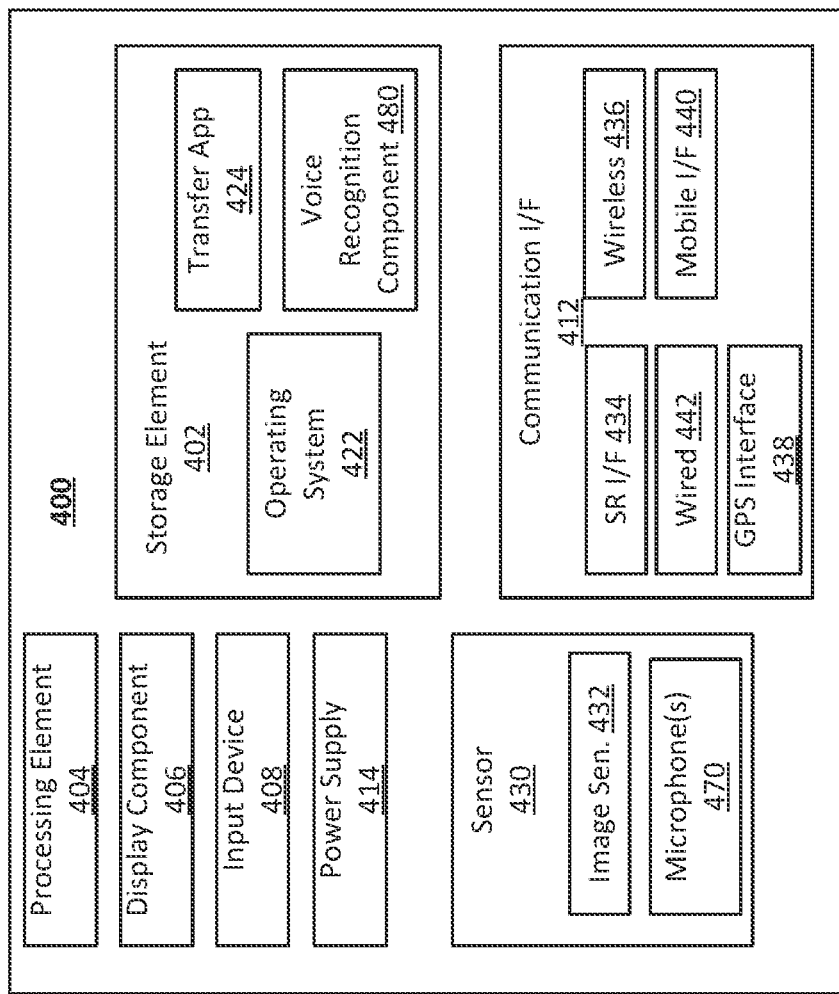
FIG. 4 is a block diagram showing an example architecture of a network-connected device that may be used in accordance with various embodiments described herein.

FIG. 4 is a block diagram showing an example architecture 400 of a network-connected device (e.g., a local network-connected device) that may be used to implement, at least in part, a speech processing-enable device configured to receive spoken and/or other natural input commands, in accordance with various aspects of the present disclosure. It will be appreciated that not all devices will include all of the components of the architecture 400 and some user devices may include additional components not shown in the architecture 400. The architecture 400 may include one or more processing elements 404 for executing instructions and retrieving data stored in a storage element 402. The processing element 404 may comprise at least one processor. Any suitable processor or processors may be used. For example, the processing element 404 may comprise one or more digital signal processors (DSPs). In some examples, the processing element 404 may be effective to determine a wakeword and/or to stream audio data to a speech processing system. The storage element 402 can include one or more different types of memory, data storage, or computer-readable storage media devoted to different purposes within the architecture 400. For example, the storage element 402 may comprise flash memory, random-access memory, disk-based storage, etc. Different portions of the storage element 402, for example, may be used for program instructions for execution by the processing element 404, storage of images or other digital works, and/or a removable storage for transferring data to other devices, etc. In various examples, the storage element 402 may comprise the task data service 164.

The storage element 402 may also store software for execution by the processing element 404. An operating system 422 may provide the user with an interface for operating the computing device and may facilitate communications and commands between applications executing on the architecture 400 and various hardware thereof. A transfer application 424 may be configured to receive images, audio, and/or video from another device (e.g., a mobile device, image capture device, and/or display device) or from an image sensor 432 and/or microphone 470 included in the architecture 400. In some examples, the transfer application 424 may also be configured to send the received voice requests to one or more voice recognition servers.

When implemented in some user devices, the architecture 400 may also comprise a display component 406. The display component 406 may comprise one or more light-emitting diodes (LEDs) or other suitable display lamps. Also, in some examples, the display component 406 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 406 may be effective to display content determined provided by a skill executed by the processing element 404 and/or by another computing device.

The architecture 400 may also include one or more input devices 408 operable to receive inputs from a user. The input devices 408 can include, for example, a push button, touch pad, touch screen, wheel, joystick, keyboard, mouse, trackball, keypad, light gun, game controller, or any other such device or element whereby a user can provide inputs to the architecture 400. These input devices 408 may be incorporated into the architecture 400 or operably coupled to the architecture 400 via wired or wireless interface. In some examples, architecture 400 may include a microphone 470 or an array of microphones for capturing sounds, such as voice requests. Voice recognition component 480 may interpret audio signals of sound captured by microphone 470. In some examples, voice recognition component 480 may listen for a "wakeword" to be received by microphone 470. Upon receipt of the wakeword, voice recognition component 480 may stream audio to a voice recognition server for analysis, such as a speech processing system. In various examples, voice recognition component 480 may stream audio to external computing devices via communication interface 412.

When the display component 406 includes a touch-sensitive display, the input devices 408 can include a touch sensor that operates in conjunction with the display component 406 to permit users to interact with the image displayed by the display component 406 using touch inputs (e.g., with a finger or stylus). The architecture 400 may also include a power supply 414, such as a wired alternating current (AC) converter, a rechargeable battery operable to be recharged through conventional plug-in approaches, or through other approaches such as capacitive or inductive charging.

The communication interface 412 may comprise one or more wired or wireless components operable to communicate with one or more other computing devices. For example, the communication interface 412 may comprise a wireless communication module 436 configured to communicate on a network, such as a computer communication network, according to any suitable wireless protocol, such as IEEE 802.11 or another suitable wireless local area network (WLAN) protocol. A short range interface 434 may be configured to communicate using one or more short range wireless protocols such as, for example, near field communications (NFC), Bluetooth, Bluetooth LE, etc. A mobile interface 440 may be configured to communicate utilizing a cellular or other mobile protocol. A Global Positioning System (GPS) interface 438 may be in communication with one or more earth-orbiting satellites or other suitable position-determining systems to identify a position of the architecture 400. A wired communication module 442 may be configured to communicate according to the USB protocol or any other suitable protocol.

The architecture 400 may also include one or more sensors 430 such as, for example, one or more position sensors, image sensors, and/or motion sensors. An image sensor 432 is shown in FIG. 4. An example of an image sensor 432 may be a camera configured to capture color information, image geometry information, and/or ambient light information.

Figure 5:
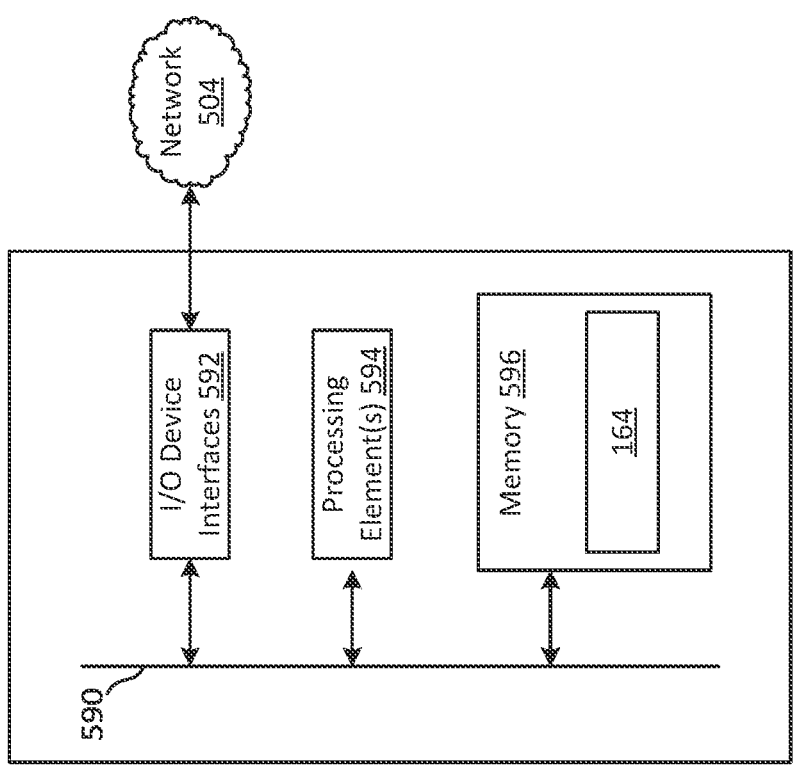
FIG. 5 is a block diagram showing an example architecture of a computing device that may be used in accordance with various embodiments described herein.

FIG. 5 is a block diagram conceptually illustrating example components of a remote device, such as a computing device executing a particular skill, a computing device executing one or more components of a speech processing system (e.g., ASR processing components, NLU processing components, applicable protocol recognition, etc.) and/or command processing. Multiple computing devices may be included in the system, such as one speech processing computing device for performing ASR processing, one speech processing computing device for performing NLU processing, one or more skill computing device(s) implementing skills, etc. In operation, each of these devices (or groups of devices) may include non-transitory computer-readable and computer-executable instructions that reside on the respective device, as will be discussed further below. The remote device of FIG. 5 may communicate with one or more other devices over a network 504 (e.g., a wide area network or local area network).

Each computing device of a speech processing system may include one or more controllers/processors 594, which may each include at least one central processing unit (CPU) for processing data and computer-readable instructions, and a memory 596 for storing data and instructions of the respective device. In at least some examples, memory 596 may store, for example, a list of N-best intents data that may be generated for particular request data. In some examples, memory 596 may store machine learning models of the NLU component 260, such as machine learned models associated with various NLU process flows (described in reference to FIG. 1A), when loaded from memory 596. In various further examples, memory 596 may be effective to store instructions effective to program controllers/processors 594 to perform the various techniques described above in reference to FIGS. 1-3. Accordingly, in FIG. 5, task data service is depicted as being stored within memory 596, as an example. The memories 596 may individually include volatile random access memory (RAM), non-volatile read only memory (ROM), non-volatile magnetoresistive memory (MRAM), and/or other types of memory. Each computing device of a speech processing system (and/or a component thereof) may also include memory 596 for storing data and controller/processor-executable instructions. Each memory 596 may individually include one or more non-volatile storage types such as magnetic storage, optical storage, solid-state storage, etc. Each computing device of a speech processing system may also be connected to removable or external non-volatile memory and/or storage (such as a removable memory card, memory key drive, networked storage, etc.) through respective input/output device interfaces 592. In various examples, the feature data and/or training data used by the various machine learning models may be stored and/or cached in memory 596.

Computer instructions for operating each computing device of natural language processing system 220 may be executed by the respective device's controllers/processors 594, using the memory 596 as temporary "working" storage at runtime. A device's computer instructions may be stored in a non-transitory manner in non-volatile memory 596 (e.g., a non-transitory computer-readable memory), memory 596, or an external device(s). Alternatively, some or all of the executable instructions may be embedded in hardware or firmware on the respective device in addition to or instead of software.

Each computing device of speech processing system 100 includes input/output device interfaces 592. A variety of components may be connected through the input/output device interfaces 592, as will be discussed further below. Additionally, each computing device of a speech processing system may include an address/data bus 590 for conveying data among components of the respective device. Each component within a computing device of a speech processing system may also be directly connected to other components in addition to (or instead of) being connected to other components across the bus 590.

As noted above, multiple devices may be employed in a single system. In such a multi-device system, each of the devices may include different components for performing different aspects of the system's processing. The multiple devices may include overlapping components. The components of a speech processing system, as described herein, are exemplary, and may be located as a stand-alone device or may be included, in whole or in part, as a component of a larger device or system.

Figure 6:
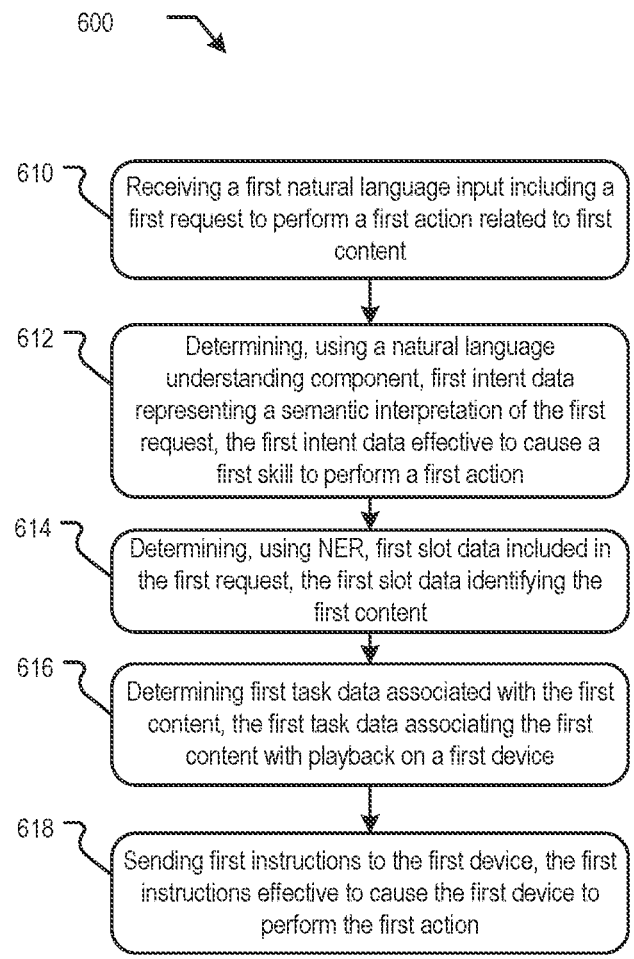
FIG. 6 depicts a flow chart showing an example process for content-based voice targeting of devices, in accordance with various aspects of the present disclosure.

FIG. 6 depicts a flow chart showing an example process 600 for content-based voice targeting of devices, in accordance with various aspects of the present disclosure. Those portions of FIG. 6 that have been previously discussed in reference to FIGS. 1-5 may not be described again for purposes of clarity and brevity. The actions of the process 600 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 600 may begin at action 610, at which a first natural language input including a first request to perform a first action related to first content may be received. For example, a user may say a wakeword, followed by a request to control content that is currently being played back by an ad hoc group of devices associated with the user's account.

Processing may continue at action 612, at which a natural language understanding component (e.g., NLU component 260) may determine first intent data representing a semantic interpretation of the first request. The first intent data may be effective to cause a skill (e.g., a skill associated with playback of the content) to perform a first action. For example, the user may request that the content be paused, that the volume be modified, that the content be rewound, etc.

Processing may continue at action 614, at which NER (e.g., NER component 762) may be used to determine first slot data included in the first request. The first slot data may identify the first content. In various examples, the first slot data may include a name of the first content, such as an artist name, a song name, a video name, an album name, etc. In some other examples, the first slot data may generally refer to the first content (e.g., "Song" in the user request "Alexa, turn up that song") and/or may identify some aspect of the first content, such as a service providing the first content, a genre of the first content, a description of the first content, a style of the first content, etc.

Processing may continue at action 616, at which first task data associated with the first content may be determined. In various examples, the first task data may be stored in user registry 150 and/or data stores 152 (FIG. 1A). The first task data may associate the first content with playback on a first device. In some cases, the first task data may associate the first content with playback on an ad hoc group of devices. Examples of task data that associate various content metadata with one or more device Ids is shown in FIG. 9.

Processing may continue at action 618, at which first instructions may be sent to the first device. The first instructions may be effective to cause the first device to perform the first action. In various examples, a skill selected by the natural language processing system 220 may send the instructions to the devices determined using the task data. In some other examples, the instructions may be sent from the skill to orchestrator 230 and orchestrator 230 may send the instructions to the relevant devices (e.g., devices of an ad hoc group of devices).

Figure 7:
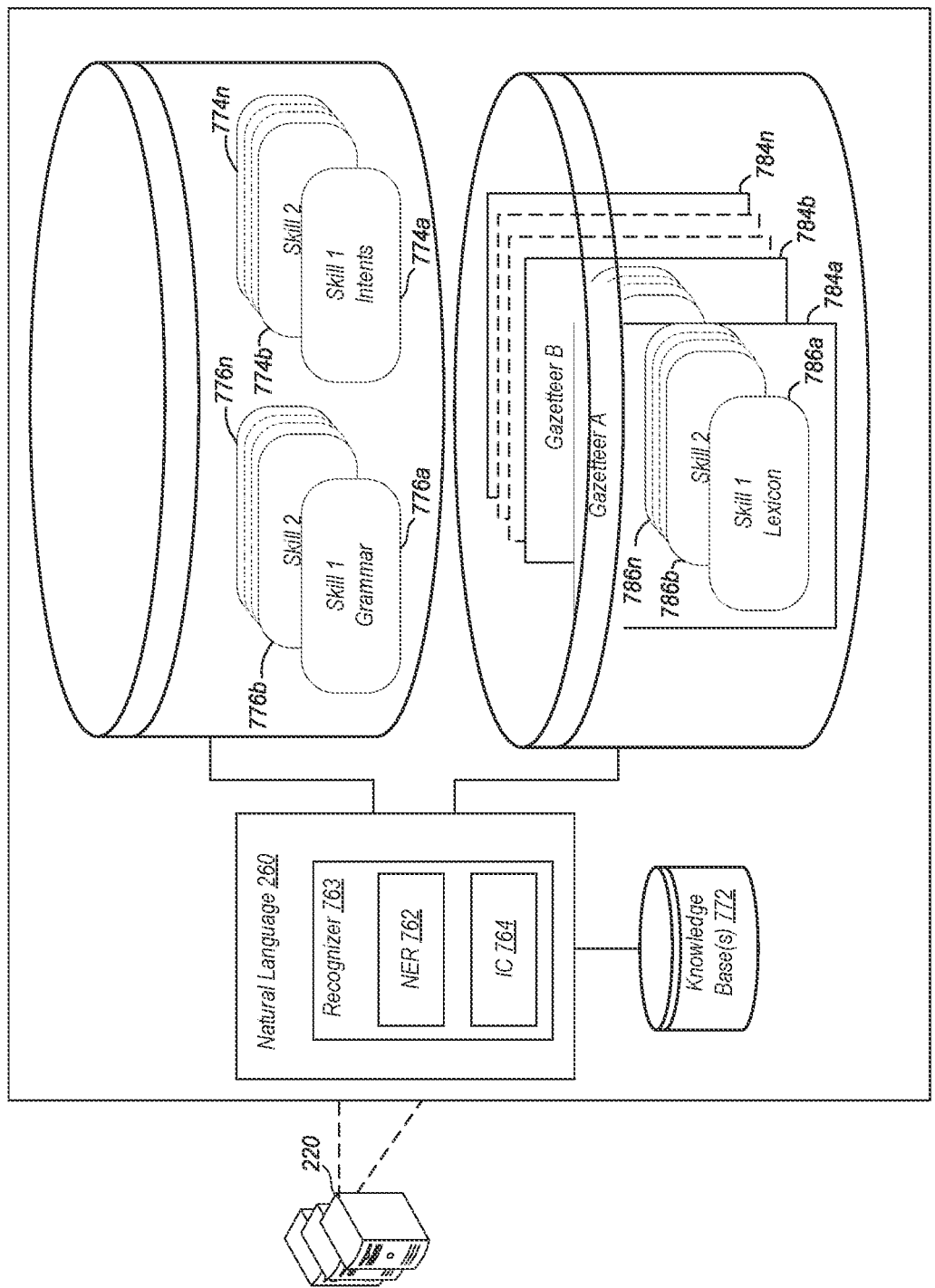
FIG. 7 is a conceptual diagram illustrating named entity recognition processing, according to embodiments of the present disclosure.

FIG. 7 illustrates an example of how NLU processing and NER processing may be performed to determine intent data and/or slot data for a given natural language input. Generally, the Natural language component 260 attempts to make a semantic interpretation of text data input thereto. That is, the natural language component 260 determines the meaning behind text data based on the individual words and/or phrases represented therein. The natural language component 260 interprets text data to derive an intent of the user as well as pieces of the text data that allow a device to complete that action.

The natural language component 260 may process ASR output data (e.g., text) including several ASR hypotheses. The natural language component 260 may process all (or a portion of) the ASR hypotheses input therein. Even though the ASR component 250 may output multiple ASR hypotheses, the natural language component 260 may be configured to only process with respect to the top scoring ASR hypothesis.

The natural language component 260 may include one or more recognizers 763. Each recognizer 763 may be associated with a different skill 290. Each recognizer 763 may process with respect to text data input to the natural language component 260. Each recognizer 763 may operate at least partially in parallel with other recognizers 763 of the natural language component 260.

Each recognizer 763 may include a named entity recognition (NER) component 762. The NER component 762 attempts to identify grammars and lexical information that may be used to construe meaning with respect to text data input therein. The NER component 762 identifies portions of text data that correspond to a named entity that may be applicable to processing performed by a skill 290. The NER component 762 (or other component of the natural language component 260) may also determine whether a word refers to an entity whose identity is not explicitly mentioned in the text data, for example "him," "her," "it" or other anaphora, exophora or the like.

Each recognizer 763, and more specifically each NER component 762, may be associated with a particular grammar model and/or database, a particular set of intents/actions (e.g., in intents database 774), and a particular personalized lexicon 786. Each gazetteer 784 may include skill-indexed lexical information associated with a particular user and/or device. For example, a Gazetteer A (784a) includes skill-indexed lexicon 786a to 786n. A user's music skill lexical information might include album titles, artist names, and song names, for example, whereas a user's contact list skill lexical information might include the names of contacts. Since every user's music collection and contact list is presumably different, this personalized information improves entity resolution.

An NER component 762 applies grammar models 776 and lexicon 786 to determine a mention of one or more entities in text data. In this manner, the NER component 762 identifies "slots" (corresponding to one or more particular words in text data) that may be used for later processing. The NER component 762 may also label each slot with a type (e.g., noun, place, city, artist name, song name, etc.). As previously described, such slot data may be used by task data service 164 to perform a lookup based on the slot data to determine which devices are associated with the slot data (e.g., where the slot data identifies some aspect of the content being played by the devices).

Each grammar model 776 includes the names of entities (i.e., nouns) commonly found in speech about the particular skill 290 to which the grammar model 776 relates, whereas the lexicon 786 is personalized to the user and/or the device (e.g., smart-home system 157) from which the user input originated. For example, a grammar model 776 associated with a shopping skill may include a database of words commonly used when people discuss shopping.

Each recognizer 763 may also include an intent classification (IC) component 764. An IC component 764 parses text data to determine an intent(s). An intent represents an action a user desires be performed. An IC component 764 may communicate with an intents database 774 of words linked to intents. For example, a music intent database may link words and phrases such as "quiet," "volume off," and "mute" to a <Mute> intent. An IC component 764 identifies potential intents by comparing words and phrases in text data to the words and phrases in an intents database 774.

The intents identifiable by a specific IC component 764 are linked to skill-specific grammar models 776 with "slots" to be filled. Each slot of a grammar model 776 corresponds to a portion of text data that the system believes corresponds to an entity. For example, a grammar model 776 corresponding to a <PlayMusic> intent may correspond to sentence structures such as "Play {Artist Name}," "Play {Album Name}," "Play {Song name}," "Play {Song name} by {Artist Name}," etc. However, to make resolution more flexible, grammar models 776 may not be structured as sentences, but rather based on associating slots with grammatical tags. In some examples, an utterance including one or more slots (e.g., an {artist name}, {movie title}, etc.) may be associated with a first intent and/or a first skill. However, in some cases, lexicon of a different skill and/or intent may be used to identify the particular entity referred to in the utterance (e.g., if the particular entity is not included in the lexicon of the associated first intent and/or first skill). Accordingly, lexicon and/or grammar of various skills may be mixed with intents associated with other skills to determine the appropriate entity referred to by the utterances.

For example, an NER component 762 may parse text data to identify words as subject, object, verb, preposition, etc. based on grammar rules and/or models prior to recognizing named entities in the text data. An IC component 764 (e.g., implemented by the same recognizer 763 as the NER component 762) may use the identified verb to identify an intent. The NER component 762 may then determine a grammar model 776 associated with the identified intent. For example, a grammar model 776 for an intent corresponding to <PlayMusic> may specify a list of slots applicable to play the identified "object" and any object modifier (e.g., a prepositional phrase), such as {Artist Name}, {Album Name}, {Song name}, etc. The NER component 762 may then search corresponding fields in a lexicon 786, attempting to match words and phrases in text data the NER component 762 previously tagged as a grammatical object or object modifier with those identified in the lexicon 786.

An NER component 762 may perform semantic tagging, which is the labeling of a word or combination of words according to their type/semantic meaning. An NER component 762 may parse text data using heuristic grammar rules, or a model may be constructed using techniques such as hidden Markov models, maximum entropy models, log linear models, conditional random fields (CRF), and the like. For example, an NER component 762 implemented by a music recognizer may parse and tag text data corresponding to "play Song Y by Artist X" as {Verb}: "Play," {Object}: "Song Y," {Object Preposition}: "by," and {Object Modifier}: "Artist X." The NER component 762 identifies "Play" as a verb, which an IC component 764 may determine corresponds to a <PlayMusic> intent. At this stage, no determination has been made as to the meaning of "Song Y" and "Artist X," but based on grammar rules and models, the NER component 762 has determined the text of these phrases relates to the grammatical object (i.e., entity) of the user input represented in the text data.

The models linked to the intent are then used to determine what database fields should be searched to determine the meaning of these phrases, such as searching a user's gazetteer 784 for similarity with the model slots. For example, a model for a <PlayMusic> intent might indicate to attempt to resolve the identified object based on {Artist Name}, {Album Name}, and {Song name}, and another model for the same intent might indicate to attempt to resolve the object modifier based on {Artist Name}, and resolve the object based on {Album Name} and {Song Name} linked to the identified {Artist Name}. If the search of the gazetteer 784 does not resolve a slot/field using gazetteer information, the NER component 762 may search a database of generic words (e.g., in the knowledge base 772). For example, if the text data includes "play songs by Artist X," after failing to determine an album name or song name called "songs" by "the Artist X," the NER component 762 may search the database for the word "songs." In the alternative, generic words may be checked before the gazetteer information, or both may be tried, potentially producing two different results.

Figure 8:
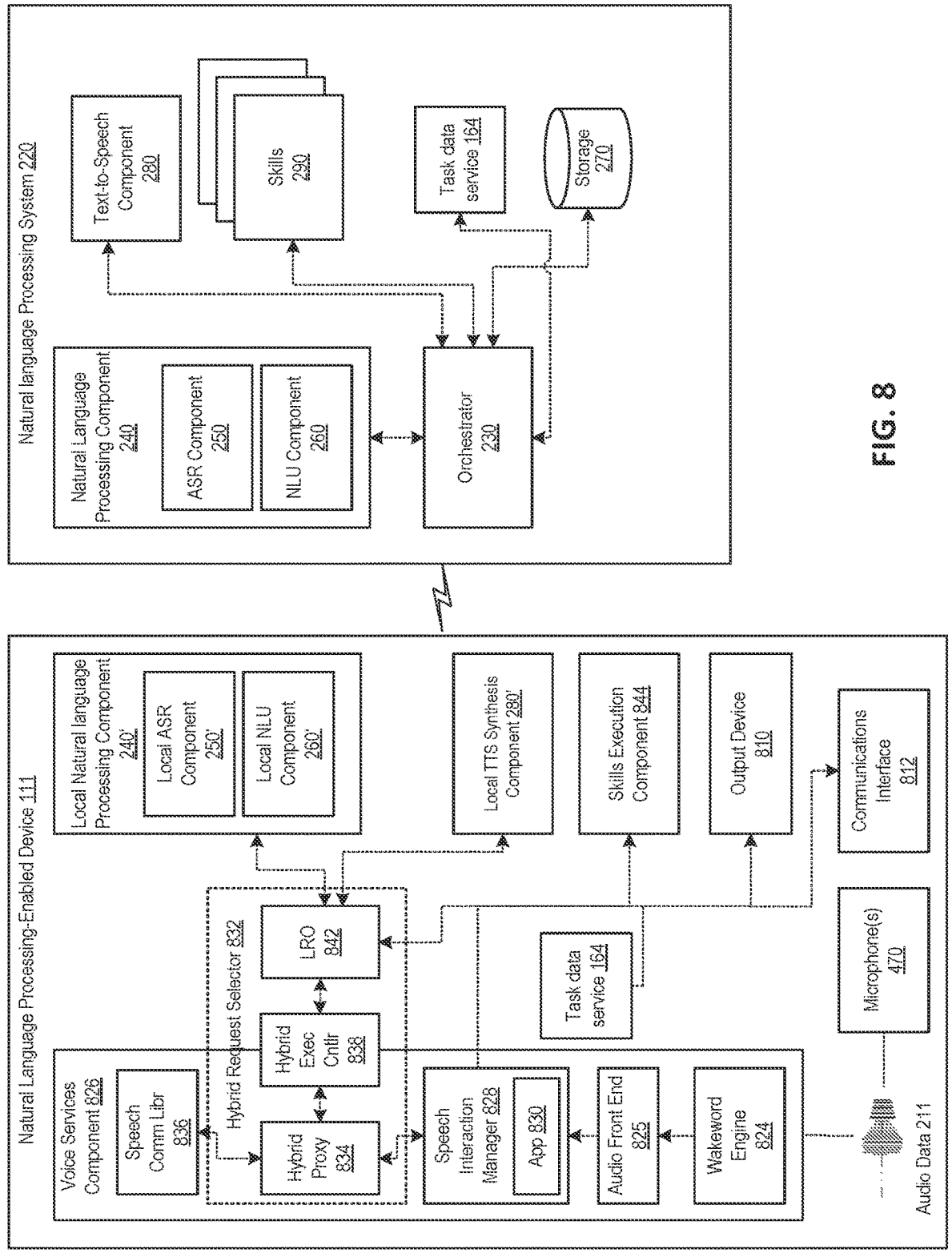
FIG. 8 is a block diagram illustrating a natural language processing-enabled device and a natural language processing management system, in accordance with embodiments of the present disclosure.

FIG. 8 is a block diagram illustrating a device 111 (e.g., a natural language processing enabled device) and a natural language processing system 220, in accordance with embodiments of the present disclosure. In various examples, device 111 may be a natural language processing-enabled device and may include microphones (e.g., far-field microphone arrays) used to transform audio into electrical signals. The device 111 may be among the network-connected devices described herein that are local to (e.g., communicating on the same LAN) the network-connected devices 120. Natural language processing may then be performed, either locally by the natural language processing components of device 111, by one or more other computing devices communicating with the device 111 over a network (e.g., natural language processing system 220), or by some combination of the device 111 and the one or more other computing devices. In various examples, device 111 may include and/or may be configured in communication with output device(s) 810 (e.g., speakers, displays, and/or other network connected devices among network-connected devices 120) effective to output information obtained in response to a user's spoken request or command, or to output content that may be of interest to one or more users. As used herein, a display of the device 111 refers to a display effective to output graphics such as images and/or video. Further, as used herein, a displayless device refers to a device that does not include a display that is effective to render graphical images or text.

In various examples, the device 111 may include and/or may be configured in communication with the task data service 164. Accordingly, the device 111 may be used to determine which on which devices control instructions should be sent based on the content referred to in a user's spoken request. For example, a user may request "Pause [song title]." After determining the intent data of the request (e.g., a pause intent) and the slot data (e.g., [song title]), the slot data may be used to perform a lookup on current task data stored by task data service 164. The device Ids associated with the slot data (in the task data) may be returned. Accordingly, the appropriate endpoint devices (even where such devices are part of an ad hoc group) may be determined using the reference to the content and the task data service 164.

A natural language processing-enabled computing system may respond to user utterances by outputting content and/or performing one or more other actions, such as playing music, providing information, calling a taxi, displaying an image, etc. Generally, input data received by the various natural language processing systems and components described herein may comprise natural language input data. Natural language input data may be in the form of audio data representing spoken user utterances (e.g., a spoken user request), text data (e.g., a request typed by a user), gesture data (e.g., data representing a user shaking their head while wearing ear buds, making a hand gesture, etc.), and/or some combination of text data, gesture data, and/or audio data.

Speech-processing systems may be configured with multiple applications (e.g., thousands, tens of thousands, or more applications) that can be used to potentially respond to a user request. Applications may be referred to herein as "skills." Natural language processing systems may be effective to process spoken and/or textual natural language inputs to determine data representing a semantic understanding of the inputs. Skills may include any application effective to communicate with a natural language processing system in order to take one or more actions based on inputs from the natural language processing system. For example, a speech-processing system may include music skills, video skills, calendar skills, timer skills, general knowledge answering skills, game skills, device control skills, etc. As described herein, skills receive NLU data comprising slot data and/or intent data and are configured to determine one or more actions based on the slot data and/or intent data. Examples of such actions may include text to be processed into output audio data (e.g., synthetic speech) via a text-to-speech (TTS) component, an executable command effective to play a song from a music service, a movie from a movie service, or the like, an executable command effective to cause a system to perform an action (e.g., turning lights on/off, controlling an appliance, purchasing an item, etc.).

The invocation of a skill by a user's utterance may include a request that an action be taken. The number of applications/skills continues to grow and the rate of growth is increasing as developers become more accustomed to application programming interfaces (APIs) and application development kits provided for the voice user interface system. Rule-based approaches and/or predefined utterance matching may be used in some systems for processing requests spoken in a certain format to invoke a particular application. In at least some examples, a "skill," "skill component," "skill," "natural language processing skill," and the like may be software running on a computing device, similar to a traditional software application running on a computing device. Such skills may include a voice user interface in addition to or instead of, in at least some instances, a graphical user interface, smart home device interface, and/or other type of interface.

In addition to using the microphone(s) 470 to capture utterances and convert them into digital audio data 211, the device 111 may additionally, or alternatively, receive audio data 211 (e.g., via the communications interface 812) from another device in the environment. In various examples, the device 111 may capture video and/or other image data using a camera. Under normal conditions, the device 111 may operate in conjunction with and/or under the control of a remote, network-based or network-accessible natural language processing system 220. The natural language processing system 220 may, in some instances, be part of a network-accessible computing platform that is maintained and accessible via a wide area network (WAN). Network-accessible computing platforms such as this may be referred to using terms such as "on-demand computing", "software as a service (SaaS)", "platform computing", "network-accessible platform", "cloud services", "data centers", and so forth. The natural language processing system 220 may be configured to provide particular functionality to large numbers of local (e.g., in-home, in-car, etc.) devices of different users. The WAN is representative of any type of public or private, wide area network, such as the Internet, which extends beyond the environment of the device 111. Thus, the WAN may represent and/or include, without limitation, data and/or voice networks, a wired infrastructure (e.g., coaxial cable, fiber optic cable, etc.), a wireless infrastructure (e.g., radio frequencies (RF), cellular, satellite, etc.), and/or other connection technologies.

In some embodiments, the natural language processing system 220 may be configured to receive audio data 211 from the device 111, to recognize speech in the received audio data 211, and to perform functions in response to the recognized speech. In some embodiments, these functions involve sending a command, from the natural language processing system 220, to the device 111 to cause the device 111 to perform an action, such as output an audible response to the user speech via output device 810 (e.g., one or more loudspeakers). Thus, under normal conditions, when the device 111 is able to communicate with the natural language processing system 220 over a WAN (e.g., the Internet), some or all of the functions capable of being performed by the natural language processing system 220 may be performed by sending a command over a WAN to the device 111, which, in turn, may process the command for performing actions. For example, the natural language processing system 220, via a remote command that is included in remote response data, may instruct the device 111 to output an audible response (e.g., using a local text-to-speech (TTS) synthesis component 280) to a user's question, to output content (e.g., music) via output device 810 (e.g., one or more loudspeakers) of the device 111, or to control other devices in the local environment (e.g., the user's home). It is to be appreciated that the natural language processing system 220 may be configured to provide other functions, in addition to those discussed herein, such as, without limitation, providing step-by-step directions for navigating from an origin to a destination location, conducting an electronic commerce transaction on behalf of a user as part of a shopping function, establishing a communication session between the current user and another user, etc.

In order to process voice commands locally, the device 111 may include a local voice services component 826. When a user utterance including the wakeword is captured by the microphone 470 of the device 111, the audio data 211 representing the utterance is received by a wakeword engine 824 of the voice services component 826. The wakeword engine 824 may be configured to compare the audio data 211 to stored models used to detect a wakeword (e.g., "Computer") that indicates to the device 111 that the audio data 211 is to be processed for determining an intent. Thus, the wakeword engine 824 is configured to determine whether a wakeword is detected in the audio data 211, and, if a wakeword is detected, the wakeword engine 824 can proceed with routing the audio data 211 to an audio front end (AFE) 825 (sometimes referred to as an acoustic front end (AFE)) of the voice services component 826. If a wakeword is not detected in the audio data 211, the wakeword engine 824 can refrain from sending the audio data 211 to the AFE 825, thereby preventing the audio data 211 from being further processed. The audio data 211 can be discarded.

The AFE 825 is configured to transform the audio data 211 received from the wakeword engine 824 into data for processing by a suitable ASR component and/or NLU component. The AFE 825 may reduce noise in the audio data 211 and divide the digitized audio data 211 into frames representing a time intervals for which the AFE 825 determines a number of values, called features, representing the qualities of the audio data 211, along with a set of those values, called a feature vector, representing the features/qualities of the audio data 211 within the frame. Many different features may be determined, and each feature represents some quality of the audio data 211 that may be useful for ASR processing and/or NLU processing. A number of approaches may be used by the AFE 825 to process the audio data 211, such as mel-frequency cepstral coefficients (MFCCs), perceptual linear predictive (PLP) techniques, neural network feature vector techniques, linear discriminant analysis, semi-tied covariance matrices, or other approaches known to those of skill in the art. In some embodiments, the AFE 825 is configured to use beamforming data to process the received audio data 211. Beamforming can be used to distinguish between the directions from which speech and noise originate. Accordingly, the microphones 470 may be arranged in a beamforming array to receive multiple audio signals, where multiple audio sources including speech may be identified in different beams and processed. Beamforming may involve processing multiple audio signals (e.g., originating from multiple microphones in a microphone array) together, such as by time shifting one audio signal with respect to another audio signal, to increase the signal and decrease the noise in the audio. Time offsets in the audio data 211, used by the AFE 825 in beamforming, may be determined based on results of the wakeword engine 824's processing of the audio data 211. For example, the wakeword engine 824 may detect the wakeword in the audio data 211 from a first microphone 470 at time, t, while detecting the wakeword in the audio data 211 from a second microphone 470 a millisecond later in time (e.g., time, t+1 millisecond), and so on and so forth, for any suitable number of audio signals corresponding to multiple microphones 470 in a microphone array.

A speech interaction manager (SIM) 828 of the voice services component 826 may receive the audio data 211 that has been processed by the AFE 825. The SIM 828 may manage received audio data 211 by processing request data and non-speech noise or sounds as events, and the SIM 828 may also manage the processing of commands that are used to respond to the user speech or non-speech noise or sounds (e.g., by controlling the action(s) of natural language processing components of device 111). The SIM 828 may include one or more client applications 830 for performing various functions at the device 111.

A hybrid request selector component 832 of the device 111 is shown as including a hybrid proxy component (HP) 834, among other components. The HP 834 can be implemented as a layer within the voice services component 826 that is located between the SIM 828 and a speech communication library (SCL) 836, and may be configured to proxy traffic to/from the natural language processing system 220. For example, the HP 834 may be configured to pass messages between the SIM 828 and the SCL 836 (such as by passing events and instructions there between), and to send messages to/from a hybrid execution controller component (HEC) 838 of the hybrid request selector component 832. For instance, command data received from the natural language processing system 220 can be sent to the HEC 838 using the HP 834, which sits in the path between the SCL 836 and the SIM 828. The HP 834 may also be configured to allow audio data 211 received from the SIM 828 to pass through to the natural language processing system 220 (via the SCL 836) while also receiving (e.g., intercepting) this audio data 211 and sending the received audio data 211 to the HEC 838 (sometimes via an additional SCL).

As will be described in more detail below, the HP 834 and the HEC 838 are configured to perform a handshake procedure to connect to each other. As part of this handshake procedure, the HP 834 and the HEC 838 exchange data including, without limitation, configurations, context, settings, device identifiers (ID), networking protocol versions, time zones, and language data (sometimes referred to herein as "locale data"). Based on at least some of this data (e.g., based at least in part on the language data) exchanged during the handshake procedure, the HEC 838 determines whether to accept or reject the connection request from the HP 834. If the HEC 838 rejects the HP's 834 connection request, the HEC 838 can provide metadata to the HP 834 that provides a reason why the connection request was rejected.

A local natural language processing component 240' (sometimes referred to as a "natural language processing component," a "spoken language understanding (SLU) component," a "speech engine," or an "engine") is configured to process audio data 211 (e.g., audio data 211 representing user speech, audio data 211 representing non-speech noise or sounds, etc.). In some embodiments, the hybrid request selector component 832 may further include a local request orchestrator component (LRO) 842. The LRO 842 is configured to notify the local natural language processing component 240' about the availability of new audio data 211 that represents user speech, and to otherwise initiate the operations of the local natural language processing component 240' when new audio data 211 becomes available. In general, the hybrid request selector component 832 may control the execution of the local natural language processing component 240', such as by sending "execute" and "terminate" events/instructions to the local natural language processing component 240'. An "execute" event may instruct the local natural language processing component 240' to continue any suspended execution based on audio data 211 (e.g., by instructing the local natural language processing component 240' to execute on a previously-determined intent in order to generate a command). Meanwhile, a "terminate" event may instruct the local natural language processing component 240' to terminate further execution based on the audio data 211, such as when the device 111 receives command data from the natural language processing system 220 and chooses to use that remotely-generated command data.

The LRO 842 may interact with a skills execution component 844 that is configured to receive intent data output from the local natural language processing component 240' and to execute a skill based on the intent.

To illustrate how the device 111 can operate at runtime, consider an example where a user utters an expression, such as "Computer, turn off the kitchen lights." The audio data 211 is received by the wakeword engine 824, which detects the wakeword "Computer," and forwards the audio data 211 to the SIM 828 via the AFE 825 as a result of detecting the wakeword. The SIM 828 may send the audio data 211 to the HP 834, and the HP 834 may allow the audio data 211 to pass through to the natural language processing system 220 (e.g., via the SCL 836), and the HP 834 may also input the audio data 211 to the local natural language processing component 240' by routing the audio data 211 through the HEC 838 of the hybrid request selector 832, whereby the LRO 842 notifies the local natural language processing component 240' of the incoming audio data 211. At this point, the hybrid request selector 832 may wait for response data from the natural language processing system 220 and/or the local natural language processing component 240'.

The local natural language processing component 240' is configured to receive the audio data 211 from the hybrid request selector 832 as input, to recognize speech (and/or non-speech audio events) in the audio data 211, to determine an intent (e.g., user intent) from the recognized speech (or non-speech audio event). This intent can be provided to the skills execution component 844 via the LRO 842, and the skills execution component 844 can determine how to act on the intent by generating directive data. In some cases, a directive may include a description of the intent (e.g., an intent to turn off {device A}). In some cases, a directive may include (e.g., encode) an identifier of a second device, such as the kitchen lights, and an operation to be performed at the second device. Directive data that is generated by the skills execution component 844 (and/or the natural language processing system 220) may be formatted using Java, such as JavaScript syntax, or JavaScript-based syntax. This may include formatting the directive using JSON. In some embodiments, a locally-generated directive may be serialized, much like how remotely-generated directives are serialized for transmission in data packets over the network. In other embodiments, a locally-generated directive is formatted as a programmatic API call with a same logical operation as a remotely-generated directive. In other words, a locally-generated directive may mimic remotely-generated directives by using a same, or a similar, format as the remotely-generated directive.

The local natural language processing component 240' may include an automatic speech recognition (ASR) component 250' that is configured to perform ASR processing on the audio data 211 to convert the audio data 211 into text data (sometimes referred to herein as "ASR text data," an "ASR result", or "ASR data"). ASR transcribes audio data 211 into text data representing the words of the user speech contained in the audio data 211. A spoken utterance in the audio data 211 can be input to the local ASR component 250', which then interprets the utterance based on the similarity between the utterance and pre-established language models available to the local natural language processing component 240'. In some embodiments, the local ASR component 250' outputs the most likely text recognized in the audio data 211, or multiple hypotheses in the form of a lattice or an N-best list with individual hypotheses corresponding to confidence scores or other scores (such as probability scores, etc.). In some embodiments, the local ASR component 250' is customized to the user (or multiple users) who created a user account to which the device 111 is registered. For instance, the language models (and other data) used by the local ASR component 250' may be based on known information (e.g., preferences) of the user, and/or on a history of previous interactions with the user.

The local natural language processing component 240' may also include a local NLU component 260' that performs NLU processing on the generated ASR text data to determine intent data and/or slot data (referred to herein as a "NLU result", or "NLU data") so that directives may be determined (e.g., by the skills execution component 844) based on the intent data and/or the slot data. Generally, the local NLU component 260' takes textual input (such as text data generated by the local ASR component 250') and attempts to make a semantic interpretation of the ASR text data.

Natural Language Processing System

In other situations, the device 111 may send the audio data 211 to the natural language processing system 220 for processing. As described above, the device 111 may capture audio using the microphone 470, and send audio data 211 (e.g., representing a spoken user request), corresponding to the captured audio, to the natural language processing system 220. The device 111 may include a wakeword detection component that detects when input audio includes a spoken wakeword, and when the wakeword is detected, the audio data 211 is sent by the device 111 to the natural language processing system 220.

Upon receipt by the natural language processing system 220, the audio data 211 may be sent to an orchestrator component 230. The orchestrator component 230 may include memory and logic that enables the orchestrator component 230 to send various pieces and forms of data to various components of the system.

Similar to the operation described above with respect to the local natural language processing component 240' of the device 111, the orchestrator component 230 may send the audio data 211 to a natural language processing component 240. An ASR component 250 of the natural language processing component 240 transcribes the audio data 211 into one or more hypotheses representing speech contained in the audio data 211. The natural language processing component 240 interprets the speech in the audio data based on a similarity between the characteristics of the audio data corresponding to the speech and pre-established language models. For example, the natural language processing component 240 may compare the audio data 211 with models for sounds (e.g., subword units such as phonemes) and sequences of sounds to identify words that match the sequence of sounds in the speech represented in the audio data 211. The natural language processing component 240 may send text data generated thereby to an NLU component 260 of the natural language processing component 240. The text data output by the natural language processing component 240 may include a top scoring hypothesis of the speech represented in the audio data 211 or may include an N-best list including a group of hypotheses of the speech represented in the audio data 211, and potentially respective scores ASR processing confidence scores.

The NLU component 260 attempts to make a semantic interpretation of the phrases or statements represented in the text data input therein. That is, the NLU component 260 determines one or more meanings associated with the phrases or statements represented in the text data based on individual words represented in the text data. The NLU component 260 interprets a text string to derive an intent of the user (e.g., an action that the user desires be performed) as well as pertinent pieces of information in the text data that allow a device (e.g., the natural language processing system 220) to complete the intent. For example, if the text data corresponds to "Play the new album by [Musical_Artist]", the NLU component 260 may determine the user intended to invoke a music playback intent to play the identified album.

The natural language processing system 220 may include a non-transitory computer-readable memory storage 270, storing various instructions for operation of the natural language processing system 220. As previously described, in some examples, the task data service 164 may be instantiated as a part of the natural language processing system 220 and/or as a separate component configured in communication with the natural language processing system 220.

As described above, the natural language processing system 220 may include one or more skill components 290. The natural language processing system 220 may also include a TTS component 280 that synthesizes speech (e.g., generates audio data) corresponding to text data input therein. The TTS component 280 may perform speech synthesis using one or more different methods. In one method of synthesis called unit selection, the TTS component 280 matches text data against one or more databases of recorded speech. Matching units are selected and concatenated together to form audio data. In another method of synthesis called parametric synthesis, the TTS component 280 varies parameters such as frequency, volume, and noise to create an artificial speech waveform output. Parametric synthesis uses a computerized voice generator, sometimes called a vocoder.

The various components of the natural language processing system 220 and the device 111 described herein may be implemented in software, hardware, firmware, or some combination thereof.

The natural language processing system 220 may reside on device 111, in a cloud computing environment, or some combination thereof. For example, the device 111 may include computing equipment, some portion of which is configured with some or all of the components or functionality of natural language processing system 220 and another portion of which is configured with some or all of the components or functionality of computing device(s) used in natural language processing system 220. The device 111 may then perform a variety of functions on its own (such as when remote communications are unavailable), and/or may communicate (when capable) with computing device(s) and/ or the natural language processing system 220 to perform other functions. Alternatively, all of the functionality may reside on the device 111 or remotely.

FIG. 9 is a block diagram of a non-transitory computer-readable memory 902 storing task data, in accordance with various aspects of the present disclosure. The various task data and device ID data is merely an example. Other, different data and/or combinations of data may be used in accordance with the various techniques described herein.

In the example shown, the non-transitory computer-readable memory 902 stores task data 904, 906, and 908. Each task data 904, 906, 908 corresponds to content being played back on at least one device associated with a user account. In some examples, device IDs may be used to identify a device and/or to distinguish the device from among other devices. In some cases, the devices may have explicit user-defined names. For example, the device ID "Smart_speaker_3" is associated with a user-defined name "kitchen." Although not shown, groups of devices may also have explicit user-defined names. In some examples, there may be no explicit user-defined name for a device and/or for a group of devices. For example, Smart_device_4 is not associated with a user-defined name. Additionally, for task data 906, Smart_speaker_1 and Smart_device_2 are grouped in an ad hoc group that is not associated with an explicitly-defined name.

Each task data 904, 906, 908 is associated with content metadata describing the content being played for the task data. It should be appreciated that the specific content metadata shown in association with each task data 904, 906, 908 is merely an example. Other content metadata apart from what is specifically shown and described may be used instead of, or in addition to, what is shown in FIG. 9. In the example, task data 904 may be associated with music playback on Smart_speaker_3. The music may be associated with Artist metadata identifying a name of the artist (e.g., the artist "Band$1"), Song metadata identifying a song currently being played (e.g., the song title "Jelloz %"), etc. Other examples of content data that may be associated with task data 904 may include a genre of the music, an album title, a streaming service, one or more keywords associated with the music, etc.

In the example, task data 906 may be associated with video playback on Smart_speaker_1 and Smart_device_2. In some cases, the Smart_speaker_1 may not include a display. In such an example, Smart_speaker_1 may only be playing audio associated with the video (e.g., a movie). The content metadata for task data 906 includes a title of the video (e.g., "Lakes") and a studio associated with the movie (e.g., "Paramax"). In addition, the content metadata may include other information such as actor's names, genre information, keywords associated with the content or portions thereof (e.g., "car chase," "love scene," etc.).

In the example, task data 908 may be associated with streaming of content (e.g., audio, video, etc.) on Smart_device_4. In the example, task data 908 may be associated with content metadata associated with a streaming service called "StreamGo@t." This may allow a user to issue a voice command by saying something like "Alexa, turn down the volume on StreamGo@t" enabling the user to target the appropriate device with a content-based voice command even when the user may not know the name of the particular song or video or even on which devices the content is currently being played back.

In various examples, the task data, including task data 904, 906, 908 may be updated/modified when the content changes and/or when the devices playing back the content change. For example, task data 906 may be updated when a user ungroups Smart_device_2 from content playback by deleting Smart_device_2 from task data 906 and/or by deleting the [ad hoc]device/group name designation. In another example, task data 904 may be modified when the song "Jelloz %" concludes and when a new song begins. For example, the task data 904 may be modified to generate updated task data by deleting the old song name and replacing it with the new song name.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method comprising:
   receiving a first natural language input comprising a first request to pause playback of a first song;
   determining, using a natural language understanding component, first intent data representing a semantic interpretation of the first request, the first intent data effective to cause a first skill associated with a first streaming service to pause music playback;
   determining, using a named entity recognition component, first slot data associated with the first request, the first slot data identifying a title of the first song;
   identifying first task data stored in non-transitory computer-readable memory, wherein the first task data associates metadata describing the first song with first device identifier data identifying a first device on which audio of the first song is being output, the metadata including the title of the first song, and wherein the first task data is stored in the non-transitory computer-readable memory prior to receiving the first natural language input;
   determining that the first slot data identifying the title of the first song corresponds to the title of the first song included in the metadata of the first task data;
   determining the first device identifier data from the first task data; and
   sending first instructions to pause playback of the first song to the first device.

2. The method of claim 1, further comprising:
   receiving a second natural language input comprising a second request to initiate playback of the first song on a second device;
   determining, using the natural language understanding component, second intent data representing a semantic interpretation of the second request, the second intent data effective to cause the first skill associated with the first streaming service to initiate music playback;
   determining, using the named entity recognition component, second slot data associated with the second request, the second slot data comprising the title of the first song;
   determining, using the named entity recognition component, third slot data associated with the second request, the third slot data comprising a name of the second device;
   generating second task data by modifying the first task data to associate the title of the first song with the name of the second device and by deleting the name of the first device; and
   sending second instructions to initiate playback of the first song to the second device.

3. The method of claim 1, further comprising:
   receiving a second natural language input comprising a second request to initiate playback of the first song on the first device, wherein the second request is received prior to the first request;
   determining, using the natural language understanding component, second intent data representing a semantic interpretation of the second request, the second intent data effective to cause the first skill to initiate music playback;
   determining, using the named entity recognition component, second slot data associated with the second request, the second slot data comprising the title of the first song;
   determining, using the named entity recognition component, second slot data associated with the second request, the second slot data comprising a name of the first device;
   and
   sending second instructions to initiate playback of the first song to the first device, wherein the second instructions are sent prior to receiving the first request.

4. A method comprising:
   receiving a first natural language input comprising a first request to perform a first action related to first content;
   determining, using a natural language understanding component, first intent data representing a semantic interpretation of the first request, the first intent data effective to cause a first skill to perform the first action;
   determining, using a named entity recognition component, first slot data included in the first request, the first slot data identifying the first content;
   identifying first task data associated with the first content, the first task data associating the first content with playback on a first device, and wherein the first task data is stored in non-transitory computer-readable memory prior to receiving the first natural language input; and
   sending first instructions to the first device, the first instructions effective to cause the first device to perform the first action.

5. The method of claim 4, further comprising:
   receiving a second request to initiate playback of the first content by a second device;
   generating second task data by modifying the first task data to associate the first content with playback on the second device and by deleting a portion of the first task data that associates the first content with playback on the first device;
   sending second instructions to the second device, the second instructions effective to cause the second device to initiate playback of the first content on the second device; and sending third instructions to the first device, the third instructions effective to cause the first device to stop playback of the first content.

6. The method of claim 4, further comprising:
receiving a second request to initiate synchronized playback of the first content by the first device and by a second device;
generating second task data by modifying the first task data to associate the first content with playback on the first device and playback on the second device; and
sending second instructions to the second device, the second instructions effective to cause the second device to initiate playback of the first content on the second device, wherein the playback on the second device is synchronized with playback of the first content by the first device;
receiving a second natural language input comprising a third request to perform a second action related to the first content;
determining, using the natural language understanding component, second intent data representing a semantic interpretation of the third request, the second intent data effective to cause the first skill to perform the second action;
determining, using the named entity recognition component, the first slot data included in the third request, the first slot data identifying the first content;
determining, using the first slot data, that the second task data associates the first content with playback on the first device and on the second device;
sending third instructions to the first device, the third instructions effective to cause the first device to perform the second action; and
sending fourth instructions to the second device, the fourth instructions effective to cause the second device to perform the second action.

7. The method of claim 4, further comprising:
determining a presence of a user in a space associated with a second device;
determining, using the first task data, the first content being played back on the first device;
sending second instructions to the second device, the second instructions effective to cause the second device to initiate playback of the first content; and
sending third instructions to the first device, the third instructions effective to cause the first device to stop playback of the first content.

8. The method of claim 4, further comprising:
receiving a second natural language input comprising a second request to perform a second action related to the first content, wherein the second request identifies a name of the first skill providing the first content;
determining, using the natural language understanding component, second intent data representing a semantic interpretation of the second request, the second intent data effective to cause the first skill to perform the second action;
determining, using the named entity recognition component, second slot data included in the second request, the second slot data identifying the name of the first skill;
determining that the first task data associates the name of the first skill with the first content and with the playback on the first device; and
sending second instructions to the first device, the second instructions effective to cause the first device to perform the second action.

9. The method of claim 4, further comprising:
determining metadata describing one or more aspects of the first content; and
generating the first task data by associating the metadata with device identifier data identifying the first device in a data structure.

10. The method of claim 4, further comprising:
receiving a second natural language input comprising a second request to perform a second action related to the first content, wherein the second request identifies an aspect of the first content;
determining, using a natural language understanding component, second intent data representing a semantic interpretation of the second request, the second intent data effective to cause the first skill to perform the second action;
determining, using the named entity recognition component, second slot data included in the second request, the second slot data identifying the aspect of the first content;
determining that the first task data associates the aspect of the first content with the playback on the first device; and
sending second instructions to the first device, the second instructions effective to cause the first device to perform the second action.

11. The method of claim 4, further comprising:
receiving a second natural language input comprising a second request to perform a second action related to the first content, wherein the second request identifies a type of content pertaining to the first content;
determining, using a natural language understanding component, second intent data representing a semantic interpretation of the second request, the second intent data effective to cause the first skill to perform the second action;
determining, using the named entity recognition component, second slot data included in the second request, the second slot data identifying the type of content; and
generating second task data by modifying the first task data to associate the second slot data identifying the type of content with playback on the first device.

12. The method of claim 4, further comprising:
receiving a second request to initiate synchronized playback of the first content by the first device and by a second device;
generating second task data by modifying the first task data to associate the first content with playback on the first device and playback on the second device;
sending second instructions to the second device, the second instructions effective to cause the second device to initiate playback of the first content on the second device, wherein the playback on the second device is synchronized with playback of the first content by the first device;
receiving a third request to initiate playback of second content, wherein the third request specifies the first device for playback of the second content;
generating third task data by modifying the first task data by deleting an association between the first device and the first content;
generating fourth task data that associates the second content with playback on the first device; and
sending third instructions to the first device, the second instructions effective to cause the first device to initiate playback of the second content on the first device.

13. A system comprising:
at least one processor; and
non-transitory computer-readable memory storing instructions that, when executed by the at least one processor, are effective to:
  receive a first natural language input comprising a first request to perform a first action related to first content;
  determine, using a natural language understanding component, first intent data representing a semantic interpretation of the first request, the first intent data effective to cause a first skill to perform the first action;
  determine, using a named entity recognition component, first slot data included in the first request, the first slot data identifying the first content;
  identify first task data associated with the first content, the first task data associating the first content with playback on a first device, and wherein the first task data is stored in the non-transitory computer-readable memory prior to receiving the first natural language input; and
  send first instructions to the first device, the first instructions effective to cause the first device to perform the first action.

14. The system of claim 13, the non-transitory computer-readable memory storing further instructions that, when executed by the at least one processor, are further effective to:
  receive a second request to initiate playback of the first content by a second device;
  generate second task data by modifying the first task data to associate the first content with playback on the second device and by deleting a portion of the first task data that associates the first content with playback on the first device;
  send second instructions to the second device, the second instructions effective to cause the second device to initiate playback of the first content on the second device; and
sending third instructions to the first device, the third instructions effective to cause the first device to stop playback of the first content.

15. The system of claim 14, the non-transitory computer-readable memory storing further instructions that, when executed by the at least one processor, are further effective to:
  receive a second request to initiate synchronized playback of the first content by the first device and by a second device;
  generate second task data by modifying the first task data to associate the first content with playback on the first device and playback on the second device; and
  send second instructions to the second device, the second instructions effective to cause the second device to initiate playback of the first content on the second device, wherein the playback on the second device is synchronized with playback of the first content by the first device;
  receive a second natural language input comprising a third request to perform a second action related to the first content;
  determine, using the natural language understanding component, second intent data representing a semantic interpretation of the third request, the second intent data effective to cause the first skill to perform the second action;
  determine, using the named entity recognition component, the first slot data included in the third request, the first slot data identifying the first content;
  determine, using the first slot data, that the second task data associates the first content with playback on the first device and on the second device;
  send third instructions to the first device, the third instructions effective to cause the first device to perform the second action; and
  send fourth instructions to the second device, the fourth instructions effective to cause the second device to perform the second action.

16. The system of claim 13, the non-transitory computer-readable memory storing further instructions that, when executed by the at least one processor, are further effective to:
  determine a presence of a user in a space associated with a second device;
  determine, using the first task data, the first content being played back on the first device;
  send second instructions to the second device, the second instructions effective to cause the second device to initiate playback of the first content; and
  send third instructions to the first device, the third instructions effective to cause the first device to stop playback of the first content.

17. The system of claim 13, the non-transitory computer-readable memory storing further instructions that, when executed by the at least one processor, are further effective to:
  receive a second natural language input comprising a second request to perform a second action related to the first content, wherein the second request identifies a name of the first skill providing the first content;
  determine, using a natural language understanding component, second intent data representing a semantic interpretation of the second request, the second intent data effective to cause the first skill to perform the second action;
  determine, using the named entity recognition component, second slot data included in the second request, the second slot data identifying the name of the first skill;
  determine that the first task data associates the name of the first skill with the first content and with the playback on the first device; and
  send second instructions to the first device, the second instructions effective to cause the first device to perform the second action.

18. The system of claim 13, the non-transitory computer-readable memory storing further instructions that, when executed by the at least one processor, are further effective to:
  determine metadata describing one or more aspects of the first content; and
  generate the first task data by associating the metadata with device identifier data identifying the first device in a data structure.

19. The system of claim 13, the non-transitory computer-readable memory storing further instructions that, when executed by the at least one processor, are further effective to:
  receive a second natural language input comprising a second request to perform a second action related to the first content, wherein the second request identifies an aspect of the first content;

determine, using a natural language understanding component, second intent data representing a semantic interpretation of the second request, the second intent data effective to cause the first skill to perform the second action;

determine, using the named entity recognition component, second slot data included in the second request, the second slot data identifying the aspect of the first content;

determine that the first task data associates the aspect of the first content with the playback on the first device; and send second instructions to the first device, the second instructions effective to cause the first device to perform the second action.

20. The system of claim 13, the non-transitory computer-readable memory storing further instructions that, when executed by the at least one processor, are further effective to:

receive a second natural language input comprising a second request to perform a second action related to the first content, wherein the second request identifies a type of content pertaining to the first content;

determine, using a natural language understanding component, second intent data representing a semantic interpretation of the second request, the second intent data effective to cause the first skill to perform the second action;

determine, using the named entity recognition component, second slot data included in the second request, the second slot data identifying the type of content; and generate second task data by modifying the first task data to associate the second slot data identifying the type of content with playback on the first device.

* * * * *